(12) United States Patent
Suzuki et al.

(10) Patent No.: US 9,664,899 B2
(45) Date of Patent: May 30, 2017

(54) OPTICAL SCANNING DEVICE AND IMAGE READING SYSTEM

(71) Applicant: CANON DENSHI KABUSHIKI KAISHA, Chichibu-shi, Saitama (JP)

(72) Inventors: Naruki Suzuki, Kumagaya (JP); Takayuki Wakabayashi, Chichibu (JP); Katsumi Arai, Saitama-ken (JP)

(73) Assignee: CANON DENSHI KABUSHIKI KAISHA, Chichibu-Shi, Saitama-Ken (JP)

( * ) Notice: Subject to any disclaimer, the term of this patent is extended or adjusted under 35 U.S.C. 154(b) by 334 days.

(21) Appl. No.: 14/517,529

(22) Filed: Oct. 17, 2014

(65) Prior Publication Data

US 2015/0036202 A1 Feb. 5, 2015

(30) Foreign Application Priority Data

Apr. 23, 2012 (JP) ................. 2012-098229

(51) Int. Cl.
*G02B 26/10* (2006.01)
*G02B 26/08* (2006.01)

(52) U.S. Cl.
CPC ......... *G02B 26/105* (2013.01); *G02B 26/085* (2013.01); *G02B 26/0825* (2013.01)

(58) Field of Classification Search
CPC .. G02B 26/0841; G02B 26/10; G02B 26/105; G02B 26/0825; G02B 26/0858; G02B 26/085; G02B 26/0833; A61B 1/00172
USPC .................... 359/119.3, 196.1, 197.1, 224.1, 359/198.1–199.4, 200.6–200.8, 202.1, 359/221.2, 223.1–225.1, 226.2, 904, 359/290–295, 838, 846, 871, 872; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 5,498,868 A | 3/1996 | Nishikawa et al. | 250/234 |
| 6,285,488 B1 | 9/2001 | Sandstrom | 359/290 |
| 2009/0021818 A1* | 1/2009 | Weir | A61B 1/00096 359/224.1 |

FOREIGN PATENT DOCUMENTS

| | | |
|---|---|---|
| JP | S63-33060 | 2/1988 |
| JP | 07-121645 | 5/1995 |
| JP | 2001-013428 | 1/2001 |
| JP | 2001-100119 | 4/2001 |
| JP | 2002-506236 | 2/2002 |
| JP | 2006-084495 | 3/2006 |

(Continued)

OTHER PUBLICATIONS

JPO Office Action dated Oct. 9, 2015 in counterpart Japanese Patent Application No. 2014-512353, together with partial English language translation.

*Primary Examiner* — Ricky Mack
*Assistant Examiner* — Kristina Deherrera
(74) *Attorney, Agent, or Firm* — Fitzpatrick, Cella, Harper & Scinto

(57) ABSTRACT

Provided is an optical scanning device that can be downsized and improve the reading rate of a laser-type image reading system. This is an optical scanning device that includes a torsion beam, and a variable focus mirror that is supported by the torsion beam. Furthermore, the variable focus mirror is supported at two symmetrical positions with respect to the axis of rotation of the torsion beam.

16 Claims, 22 Drawing Sheets

(56) References Cited

FOREIGN PATENT DOCUMENTS

| JP | 2010-008543 | 1/2010 |
|---|---|---|
| JP | 2012-242685 | 12/2012 |
| WO | 99/45441 | 9/1999 |

* cited by examiner

F I G. 2C
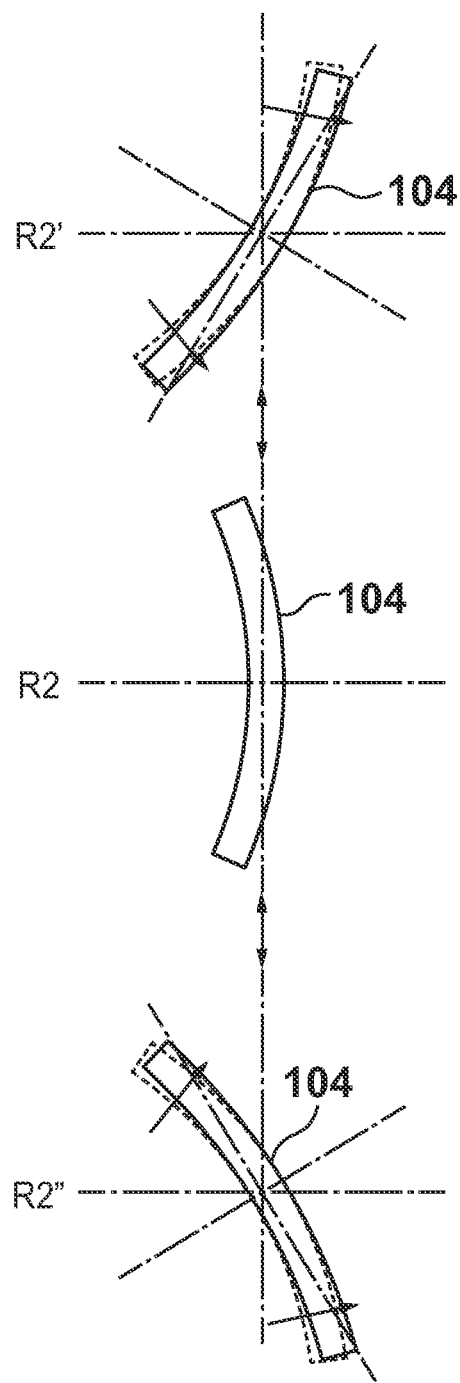

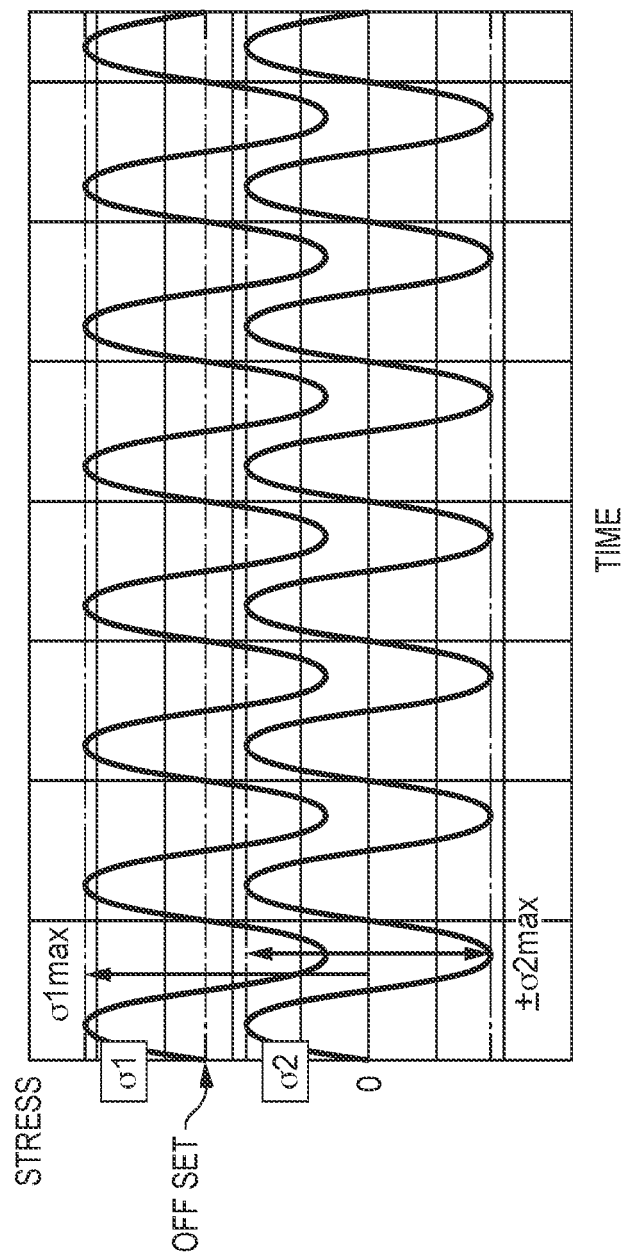

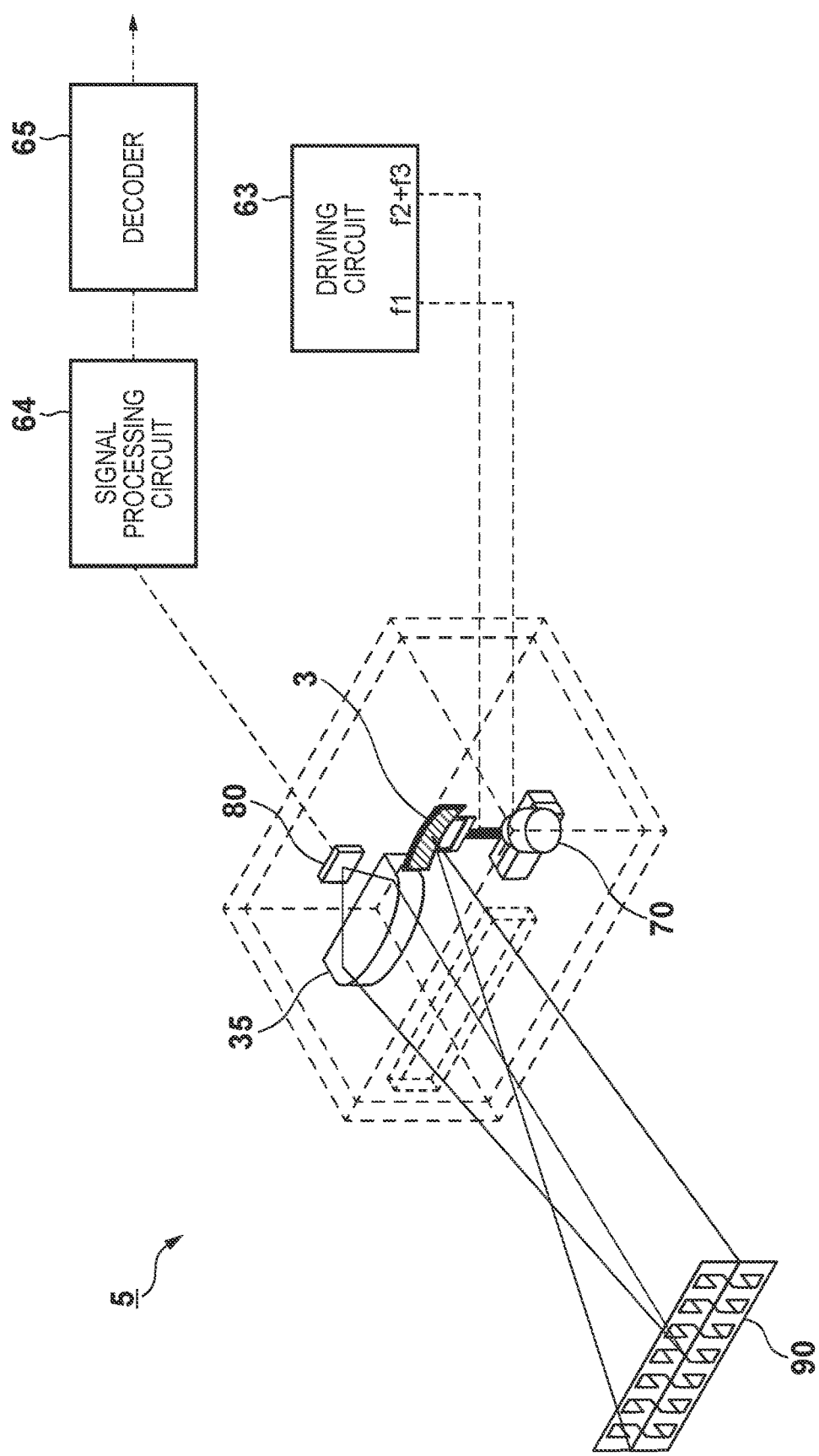

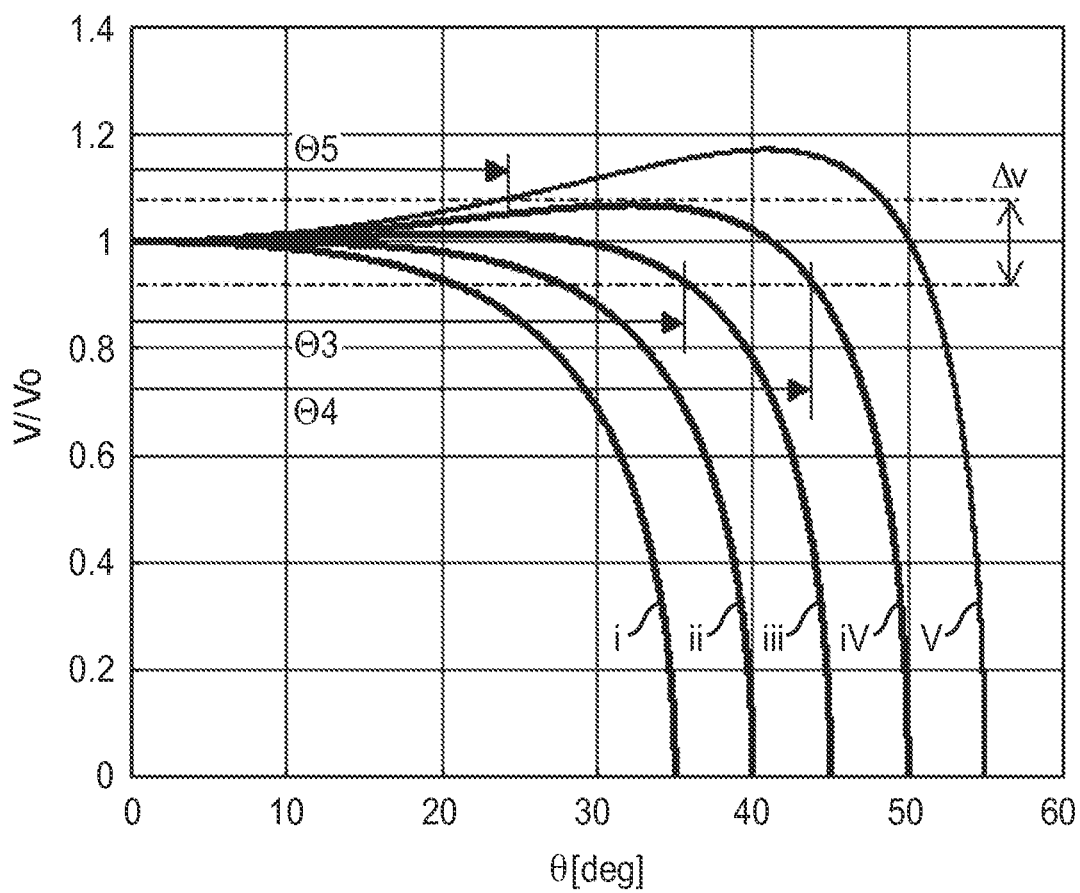
F I G. 15A

OPTICAL SCANNING DEVICE AND IMAGE READING SYSTEM

This application is a continuation of International Patent Application No. PCT/JP2013/002720 filed on Apr. 23, 2013, and claims priority to Japanese Patent Application No. 2012-098229 filed on Apr. 23, 2012, the entire content of both of which is incorporated herein by reference.

TECHNICAL FIELD

The present invention relates to an optical scanning device that performs scanning with a light flux such as laser light, and an image reading system including the same.

BACKGROUND ART

As devices that read an optical pattern such as a barcode, laser-type devices, line-sensor-type devices using a CCD line sensor, and image-sensor-type devices using a CMOS sensor are practically used. The laser-type devices are of a type in which scanning with a laser light is performed using a vibrating mirror and a change in intensity of reflected light with time is detected, and have a significant advantage in terms of cost since an inexpensive optical sensor can be used.

In recent years, line-sensor-type devices and image-sensor-type devices have an improved reading rate (success rate of reading), and accept wide barcodes. Therefore, laser-type devices are required to have an improved reading rate and accept wide barcodes as well. As an invention of the laser-type device that improves the reading rate, an invention that uses a variable focus mirror has been proposed (see Patent reference 1). In this method, the variable focus mirror is disposed between a laser diode and an optical scanner, and is driven at a speed that is slower than the laser scanning speed. Accordingly, scanning in which a focal length is varied in each scanning step is performed, that is, the laser beam waist position varies periodically, thus enlarging the readable range and improving the reading rate.

PRIOR ART DOCUMENT

Patent reference 1: Japanese Patent Laid Open No. 07-121645

DISCLOSURE OF INVENTION

Problems that the Invention is to Solve

However, in the invention according to Patent reference 1, since the optical scanner and the variable focus mirror are separate optical components, the number of components is large and the cost advantage of the laser-type device cannot be realized. Furthermore, the invention of Patent reference 1 cannot satisfy the requirement for downsizing a reading device as well.

Furthermore, in the invention of Patent reference 1, it is difficult to detect a wide barcode with a high reading rate. In order to accept a wide barcode, the angle of laser scanning needs to be large. However, if the angle of laser scanning is large, there will be a large difference in laser projection distance between the middle of the scan and the ends of the scan. That is, the beam diameter increases depending on the scan position, resulting in deterioration in reading resolution. Therefore, in the invention according to Patent reference 1, the rate of reading a high-resolution barcode significantly decreases. In order to detect a wide barcode at a scan angle in the range in which the resolution can be maintained even at the end of scan, the projection distance needs to be significantly extended. However, a significantly extended projection distance may not only deteriorate the reading rate due to a decrease in reflected light intensity but also make downsizing difficult.

Therefore, it is an object of the present invention to provide, for example, an optical scanning device that can be downsized and has an advantage in cost.

Means of Solving the Problems

The present invention provides, for example, an optical scanning device that includes a torsion beam, and a variable focus mirror that is supported by the torsion beam, wherein the variable focus mirror changes the direction of a light flux, and an object to be scanned is scanned with the light flux.

Effects of the Invention

According to the present invention, a vibrating mirror itself that reflects light is configured by the variable focus mirror, and thus it is possible to reduce the number of components as compared with that of the conventional technique in which a vibrating mirror and a variable focus mirror are provided separately. That is, by reducing the number of components, it is possible to provide an optical scanning device that can be downsized and has an advantage in cost.

Other features and advantages of the present invention will become more apparent from the following description with reference to the accompanying drawings. Note that, in the accompanying drawings, the same reference numerals are given to the same or similar configurations.

BRIEF DESCRIPTION OF DRAWINGS

The accompanying drawings are included in the specification and constitute part thereof, showing embodiments of the present invention and being used, together with the description thereof, for illustrating the spirit of the present invention.

FIG. 2C shows plan views illustrating the function of the present invention.

FIG. 8 is a graph illustrating a stress of the present invention.

FIG. 9 is a perspective view illustrating Example 1 of the present invention.

FIG. 15A is a graph illustrating an operation of the optical scanning device of the present invention.

MODE FOR CARRYING OUT THE INVENTION

First Embodiment

Figure 1A:
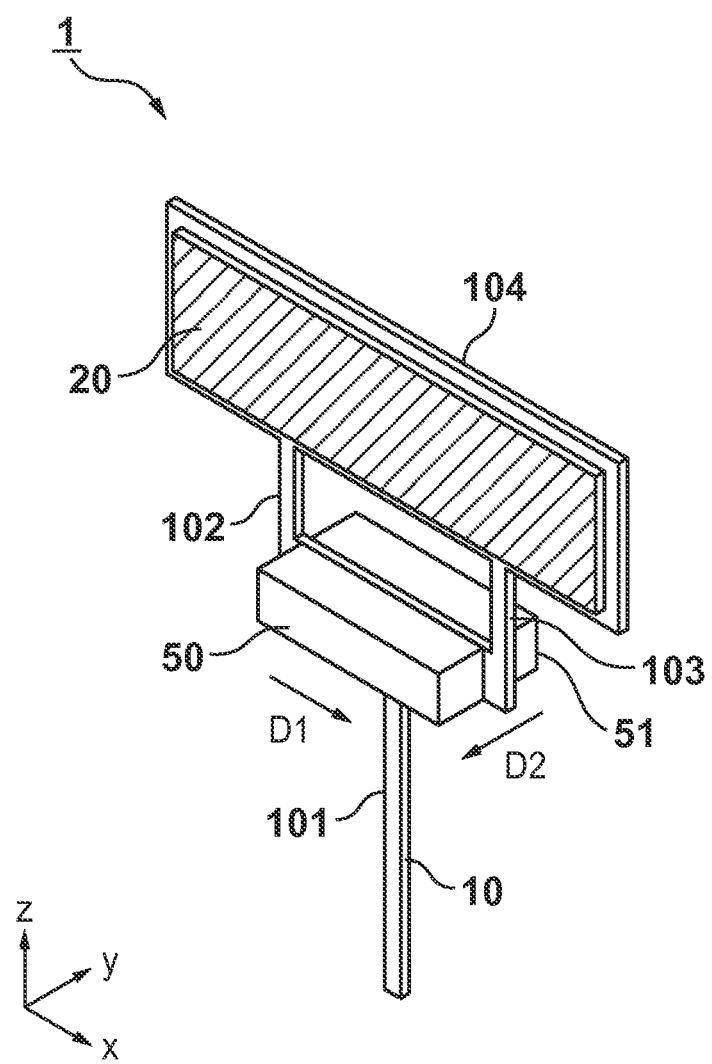
FIG. 1A is a perspective view illustrating a first embodiment of the present invention.
Figure 1B:
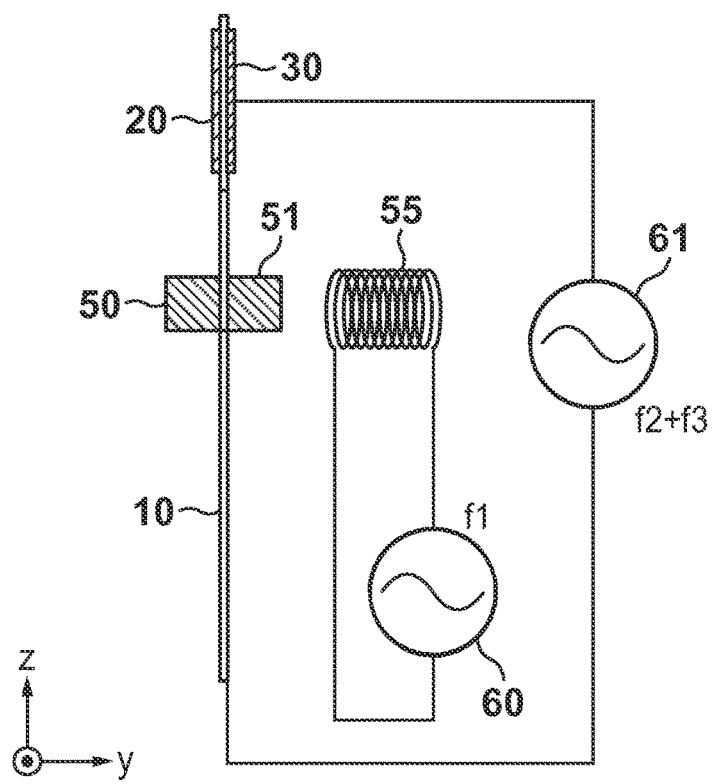
FIG. 1B is a diagram illustrating the first embodiment of the present invention.
Figure 1C:
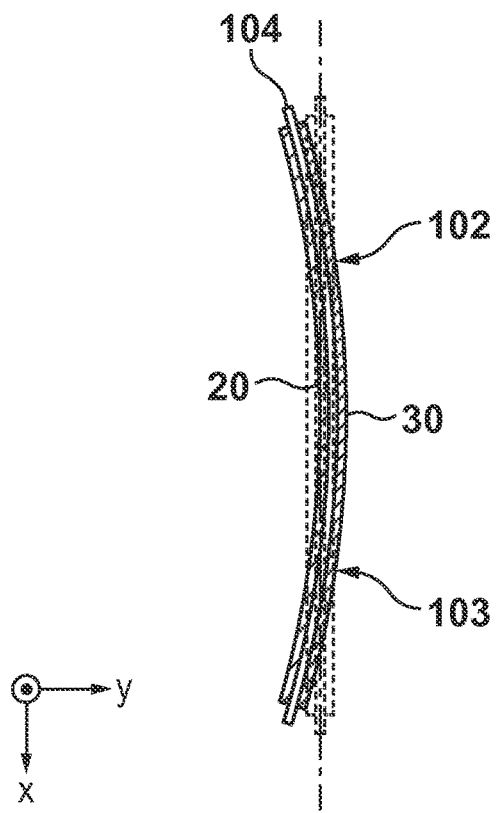
FIG. 1C is a plan view illustrating the first embodiment of the present invention.

FIGS. 1A, 1B, and 1C show an optical scanning device 1, serving as a vibrating mirror of a first embodiment of the present invention. The x-axis, y-axis, and z-axis are defined as shown in FIGS. 1A, 1B, and 1C. A vibrating member 10 includes a torsion beam 101, a mirror section 104, and supporting sections 102 and 103 that support the mirror section 104. Note that the torsion beam may also be referred to as a gimbal, a hinge, or a torsion bar. In the present embodiment, the torsion beam 101 and the mirror section 104 are provided in one piece. For example, the torsion beam 101 and the mirror section 104 are made from the same metal material. The upper parts of the supporting sections 102 and 103 are connected to the lower part of the mirror section 104. The lower parts of the supporting sections 102 and 103 are connected to each other via a connection. Note that, in FIG. 1A, the connection is hidden since it is sandwiched between magnets 50 and 51. The upper part of the torsion beam 101 is connected to the lower part of the connection. The mirror section 104 rotates around the torsion beam 101 that serves as the axis of rotation. The direction of the length of the torsion beam 101 is in parallel to the z-axis direction. A reflective film 20 is formed on a surface of the mirror section 104 as needed. Note that the direction of the thickness of the mirror section 104 is in parallel to the y-axis direction. Also, the front and rear surfaces of the mirror section 104 are flat and in parallel to the x-axis direction. Note that, when the reflective film 20 is provided on the mirror section 104, the surface of the reflective film 20 substantially serves as a mirror surface, and the mirror section 104 serves as a base body that is formed in one piece with the torsion beam 101. The reflective film may be provided on one or both of the surfaces of the mirror section. In either case, by forming the torsion beam 101 and the mirror section 104, serving as a variable focus mirror, in one piece, it is possible to downsize the entire device.

As shown in FIGS. 1A and 1B, the magnets 50 and 51 are arranged in the vicinity of the connection for the supporting sections 102 and 103. That is, the magnets 50 and 51 are magnets that are mounted on the two supporting sections 102 and 103. A driving coil 55 is a coil that is arranged corresponding to the magnets 50 and 51, and generates a magnetic field upon application of an electric signal of a first frequency. Note that the magnetizing directions of the magnets 50 and 51 are the same. Furthermore, since a rotational torque needs to be applied to the torsion beam 101, it is sufficient that the magnetizing direction of the magnets 50 and 51 is a direction that is orthogonal to the z-axis direction of the torsion beam 101 (for example, the direction of an arrow D1 or D2 of FIG. 1A, or a direction opposite thereto). An electric signal is supplied to the driving coil 55 from a driving circuit 60, and thereby the driving coil 55 generates a magnetic field. With this magnetic field, the magnets 50 and 51 attract or repel so as to induce torsional vibration to the torsion beam 101. The torsional vibration of the torsion beam 101 rotates and vibrates the mirror section 104. Therefore, the mirror section 104 changes (deviates) the direction of a light flux (laser light) that was output from a light source. Accordingly, optical scanning is realized by the mirror section 104.

A piezoelectric element 30 that changes the curvature of the mirror section 104 is arranged on the surface that is opposite to the mirror surface of the mirror section 104, serving as the variable focus mirror. The piezoelectric element 30 functions as a second piezoelectric element that changes the curvature of the mirror surface upon application of an electric signal. As shown in FIG. 1C, the mirror section 104 is subjected to bending deformation by the piezoelectric element 30 expanding and contracting depending on an electric signal (of a frequency f2 and f3) supplied from a driving circuit 61. FIG. 1B shows the vibrating member 10 made from a metal material. Accordingly, the vibrating member 10 functions as an electrode or a wiring of the piezoelectric element 30. Since the curvature of the surface of the mirror section 104 is changed due to this bending deformation caused by the piezoelectric element 30, the mirror section 104 functions as a variable focus mirror.

According to the present invention, since an optical scanning mirror and a focus adjustment mirror are realized by the single mirror section 104, serving as a variable focus mirror, the number of components can be reduced as compared with that of the conventional technique in which a vibrating mirror and a variable focus mirror are provided separately. That is, the present invention allows the provision of an optical scanning device that can be downsized by a reduction in number of components, and has an advantage in cost.

As shown in FIG. 1C, there are two positions of the mirror section 104 that are not displaced in the y-axis direction even when the mirror section 104 is bent and deformed. At these two positions, the supporting sections 102 and 103, which extend from the connection that extends in two directions from the torsion beam 101, are connected to the mirror section 104. The supporting sections 102 and 103 function as two supporting sections that are arranged at two symmetrical positions with respect to the axis of rotation of the torsion beam 101, and support the variable focus mirror. With this, even when a bending vibration is induced to the mirror section 104, the gravity center of the mirror section 104 is not displaced. In this way, by connecting the supporting sections 102 and 103 to the mirror section 104 at the two positions thereof that are not displaced in the y-axis direction, it is possible to suppress deflection vibration from being induced to the torsion beam 101. Note that, when the mirror section 104 is subjected to torsional vibration and deflection vibration at the same time, the vibrating member 10 vibrates abnormally, thus disturbing normal optical scanning. According to the present invention, since this abnormal vibration is suppressed, it is possible to perform optical scanning with accuracy.

In FIG. 1A, the vibrating member 10 has a one-piece structure, but may not necessarily have the one-piece structure. However, the vibrating member 10 having a one-piece structure is advantageous in terms of durability of the joint section, simplification of the manufacture processing, and a reduction in cost. The vibrating member 10 can be made from a metal material, a silicon wafer, a ceramic substrate, or the like. As a forming method, etching, press working, laser processing, wire electric discharge machining, or the like can be adopted. However, use of a metal material is advantageous in terms of impact resistance. This is because a metal material is not easily broken. Specifically, use of stainless steel such as SUS 301 or SUS 631, a copper alloy, a Co—Ni base alloy, or the like is advantageous in terms of repetition durability. Among them, a Co—Ni base alloy such as SPRON 510 manufactured by Seiko Instruments Inc. has a particularly high endurance limit. A Co—Ni base alloy is suitable for the optical scanning device 1 of the present invention to which a torsional stress and a bending stress are repeatedly applied.

The reflective film 20 is made of, for example, a vapor-deposited film of Au, Ag, Al, or the like, and an enhanced reflective film may be formed as needed.

The material of the magnets 50 and 51 is not particularly limited. However, when a magnet that is as small as possible and has a magnetic force as strong as possible is adopted, it is possible to reduce the moment of inertia caused by vibration. For example, an Nd—Fe—B base magnet or a Sm—Co base magnet that has a strong magnetic force, a Fe—Cr—Co base magnet whose shape can be downsized and that is excellent in workability or the like may be adopted.

If lead zirconate titanate (PZT) is used for the material of the piezoelectric element 30, an amount of displacement will be large, but the material of the piezoelectric element 30 is not limited only to this. For example, a material having a piezoelectric property, such as barium titanate, lead titanate, or lead niobate, may be adopted. The piezoelectric element 30 is formed by adhesion of a sintered compact element or direct film formation. The piezoelectric element having a structure in which a sintered compact is stacked has an excellent property since it is largely displaced. On the other hand, direct film formation on the mirror section 104 of the vibrating member 10 is advantageous in terms of durability of the adhesion section. Specifically, an aerosol deposition method and a gas deposition method have a high deposition rate, and can easily form a thick film having a good film quality. When PZT is used for the material of the piezoelectric element 30 and a metal material is used for the vibrating member 10, an improvement in piezoelectric property is achieved by forming an intermediate layer for preventing lead from diffusing. Furthermore, when, among metal materials, a material having a high heat resistance is used, a high temperature can be set for a heat treatment. For example, an age-hardening treatment at about 500° C. to 600° C. can be performed on a Co—Ni base alloy.

Figure 2A:
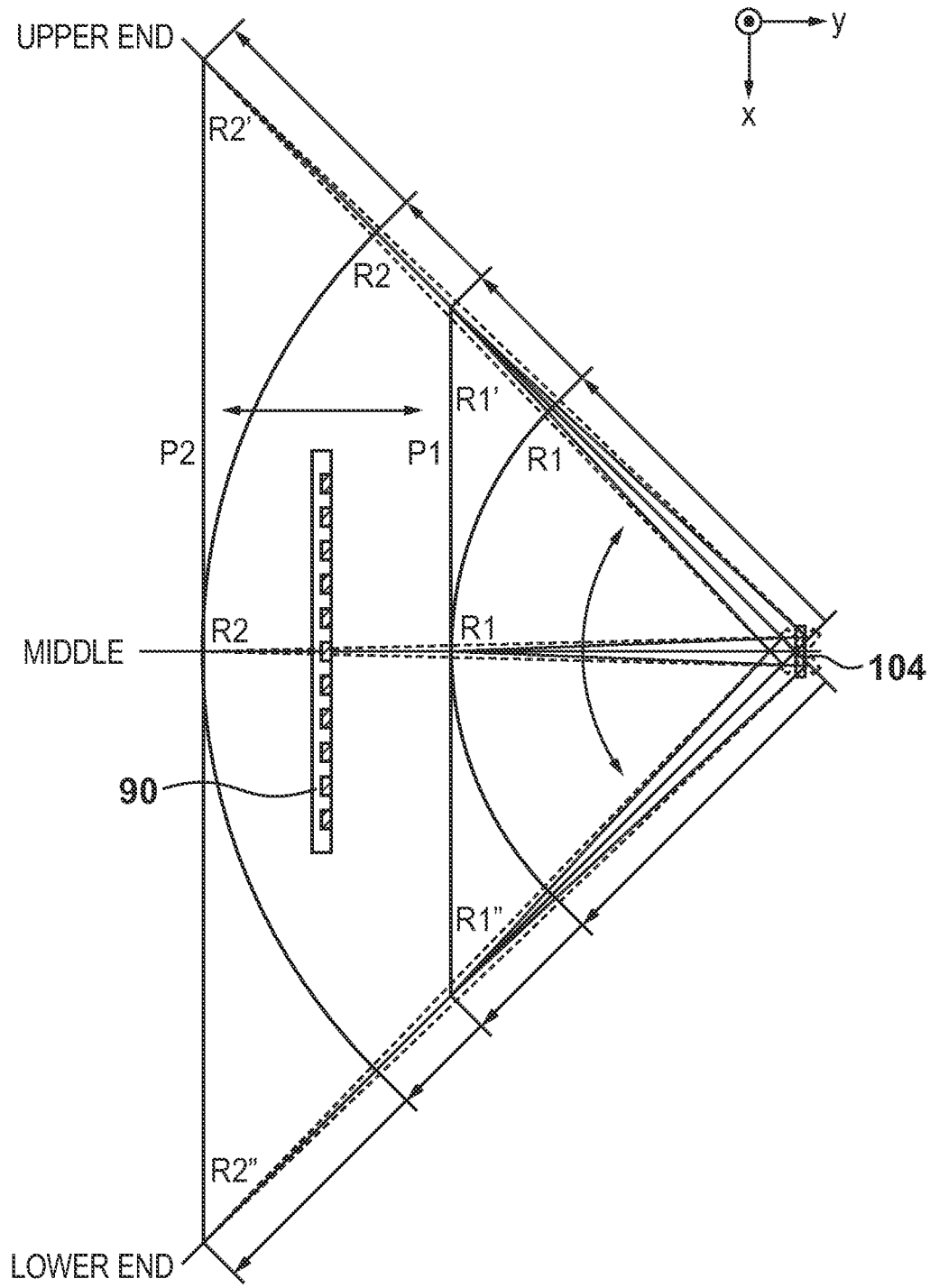
FIG. 2A is a plan view illustrating the function of the present invention.
Figure 2B:
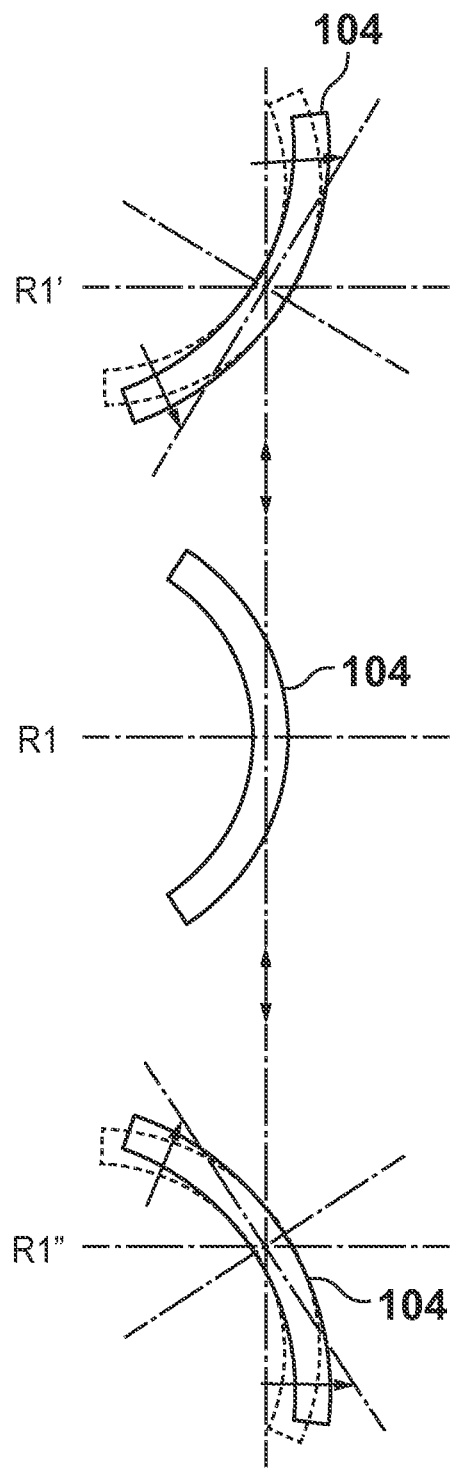
FIG. 2B shows plan views illustrating the function of the present invention.

The principle of the reading rate improvement by the optical scanning device 1 according to the present invention will be described with reference to FIGS. 2A to 2C. FIG. 2A is a plan view showing laser light scanning by the optical scanning device 1, the optical scanning device 1 being viewed from above. In FIG. 2A, laser light moves from the upper end of a surface P1 to the middle, to the lower end thereof, to the middle, and to the upper end thereof, in this stated order. Here, a distance from the laser light scanning center to the upper end of the surface P1 is defined as R1', the distance to the middle thereof is defined as R1, and the distance to the lower end thereof is defined as R1". Furthermore, here, the distance from the laser light scanning center to the upper end of the surface P2 is defined as R2', the distance to the middle thereof is defined as R2, and the distance to the lower end thereof is defined as R2". A barcode 90 is arranged in parallel to the surface P1 and the surface P2 at any position between the surface P1 and the surface P2. FIG. 2B shows the state of the mirror section 104 when the upper end of the surface P1 is scanned (hereinafter, referred to as a state (R1')), the state of the mirror section 104 when the middle of the surface P1 is scanned (hereinafter, referred to as a state (R1)), and the state of the mirror section 104 when the lower end of the surface P1 is scanned (hereinafter, referred to as a state (R1")). FIG. 2C shows the state of the mirror section 104 when the upper end of the surface P2 is scanned (hereinafter, referred to as a state (R2')), the state of the mirror section 104 when the middle of the surface P2 is scanned (hereinafter, referred to as a state (R2)), and the state of the mirror section 104 when the lower end of the surface P2 is scanned (hereinafter, referred to as a state (R2")).

In the present embodiment, when the middle of the surface P1 is scanned with laser light, a predetermined electric signal is applied to the piezoelectric element 30, and thereby the curvature (1/R1) as shown in FIG. 2B is given to the mirror section 104. That is, the radius of curvature of the mirror section 104 is R1. Here, the beam waist is located at the middle of the surface P1 that is at the distance R1 from the scanning center.

It is assumed that the mirror section 104 was rotated due to the torsional vibration of the torsion beam 101 and the state of the mirror section 104 was shifted to the state (R1') of FIG. 2B. That is, when the upper end of the surface P1 is scanned by laser light, the driving circuit 61 varies the electric signal that is applied to the piezoelectric element 30 so that the curvature of the mirror section 104 is 1/R1' and the radius of curvature is R1' (R1<R1'). Accordingly, the radius of curvature is reduced from 1/R1 to 1/R1', and the beam waist is located at the upper end of the surface P1 that is at the distance R1' from the scanning center. If the curvature was maintained at 1/R1, the beam waist would be located at the distance R1 from the scanning center, and thus the beam diameter increases at the upper end of the surface P1, resulting in a decrease in resolution and a deterioration in reading rate. Therefore, according to the present embodiment, when the upper end of the surface P1 is scanned, the radius of curvature of the mirror section 104 is changed to R1' so that the beam waist is located on the surface P1.

In the case of scanning of the lower end as well, the beam waist is maintained on the surface P1 by changing the radius of curvature to R1" in the state (R1") of FIG. 2B. When an optical pattern such as the barcode 90 is disposed on the surface P1, it is possible to obtain the same resolution between the middle of the scan and the ends of the scan. Particularly, even when the scan angle is enlarged in order to cover a wide barcode, there is the effect that a significant improvement in reading rate is achieved.

Similarly, FIG. 2C shows the modified states of the mirror section 104 in which the beam waist is maintained on the surface P2. As shown in FIG. 2C, by changing the curvature depending on the scan position, the beam waist is always maintained on the surface P2. Furthermore, according to the present embodiment, by continuously moving the scan surface from the surface P1 to the surface P2, it is possible to reliably detect the barcode with a high resolution as long as it is positioned in the range from the surface P1 to the surface P2. For example, a plurality of times of scanning are performed while moving the barcode from the surface P1 to the surface P2, and the scanning results are decoded, and when an effective reading result has been obtained, the scanning may end.

Figure 3:
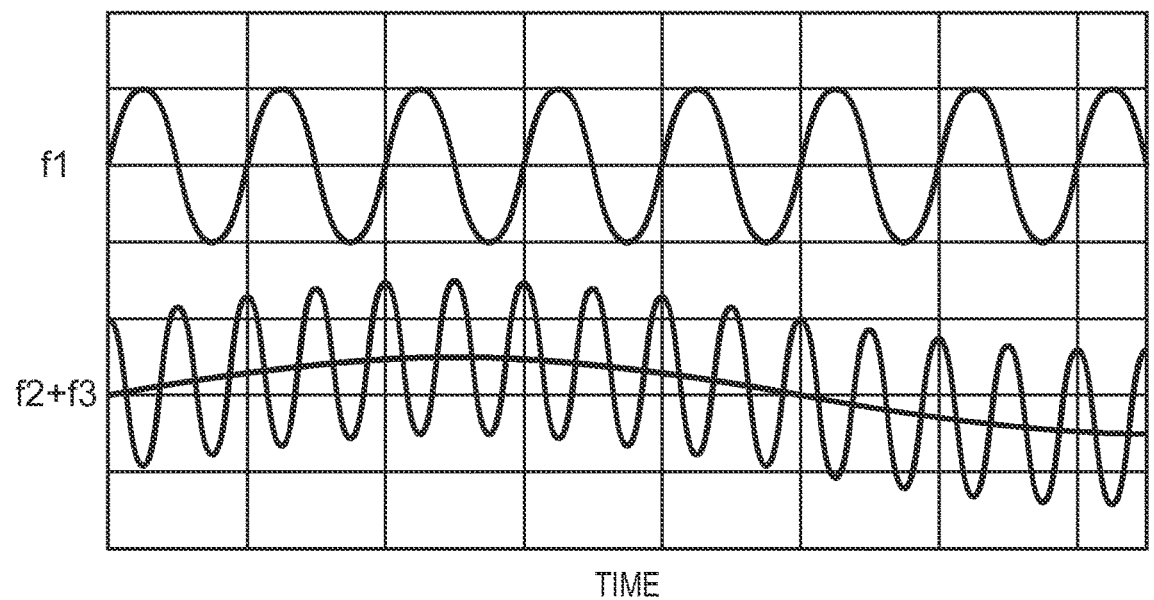
FIG. 3 is a graph illustrating drive signals of the present invention.

FIG. 3 shows examples of drive signals for performing scanning as shown in FIGS. 2A to 2C, the drive signals being generated by the driving circuits 60 and 61. The driving circuits 60 and 61 serve as drive controllers that simultaneously generate a first drive signal for inducing torsional vibration to the torsion beam 101 and a second drive signal for inducing bending deformation to the variable focus mirror (mirror section 104). Here, the driving circuits 60 and 61 are shown as separate circuits, and may be provided on individual substrates or a single substrate. Here, the driving circuit 61 generates, as the second drive signal, a signal obtained by superimposing a plurality of frequencies that are different from the first frequency of the first drive signal that is output from the driving circuit 60. At that time, the driving circuit 61 preferably generates, as the second drive signal, a signal including a signal of a frequency that corresponds to an even multiple of (e.g., two-times or four-times higher than) the first frequency. This is because efficient driving of the variable focus mirror can be realized. Specifically, the driving circuit 61 preferably generates, as the second drive signal, a signal obtained by superimposing a signal having a frequency that is two times higher than the first frequency of the first drive signal, and a signal having a frequency that is four times higher than the first frequency. Note that the driving circuit 61 generates the second drive signal while generating the first drive signal, thereby making it possible to drive the variable focus mirror by an efficient operation. According to the present embodiment, for example, the driving circuit 60 serves as a first electric signal generation unit for generating a first electric signal of a first frequency so as to induce torsional vibration to the torsion beam 101. That is, the driving circuit 60 outputs a first electric signal of a first frequency f1 in order to induce rotational vibration to the mirror section 104. On the other hand, the driving circuit 61 serves as a second electric signal generation unit that generates a second electric signal having a frequency that is an even multiple of (here, two-times higher than) the first frequency, and a third electric signal having a third frequency that is lower than the first frequency, so as to induce, to the variable focus mirror, a bending vibration that is obtained by superimposing deformation by the second electric signal and deformation by the electric signal of the third frequency. That is, in order to induce the curvature deformation to the mirror section 104, the driving circuit 61 outputs an electric signal that is obtained by superimposing the second electric signal, which has a second frequency f2 that is two times higher than the first frequency f1, and the third electric signal, which has the third frequency f3 that is sufficiently lower than the first frequency f1. The second electric signal is a signal for maintaining the beam waist always on the scan surface during one scanning. The third electric signal is a signal for continuously varying the distance from the scanning center to the scan surface.

Note that the number of times of scanning in a range from the surface P1 to the surface P2 increases as a difference between the frequency f1 and the frequency f3 is greater. Therefore, the focus accuracy is improved. However, a read time needed for bringing the barcode into focus and obtaining an effective signal is extended. Furthermore, the read time also depends on a time of one scanning, that is, the frequency of rotation of the mirror section 104. For example, when reading in which the frequency of rotation of the mirror section 104 is in the range from 50 Hz to 100 Hz is performed within 0.2 second, the frequency f3 is about 10 to 20 times higher than the frequency f1. Furthermore, the scan angle of the mirror section 104 is proportional to the amplitude of the drive signal of the frequency f1 when the torsion beam 101 is used within an elastic range of the material of the torsion beam 101. Furthermore, the mirror section 104 configures a unimorph-type piezoelectric vibrator to which the piezoelectric element 30 is adhered. Therefore, the magnitude of the curvature depends on the amplitude of a drive signal that is applied to the piezoelectric element 30, the drive signal being obtained by synthesizing the frequency f2 and the frequency f3.

Figure 4:
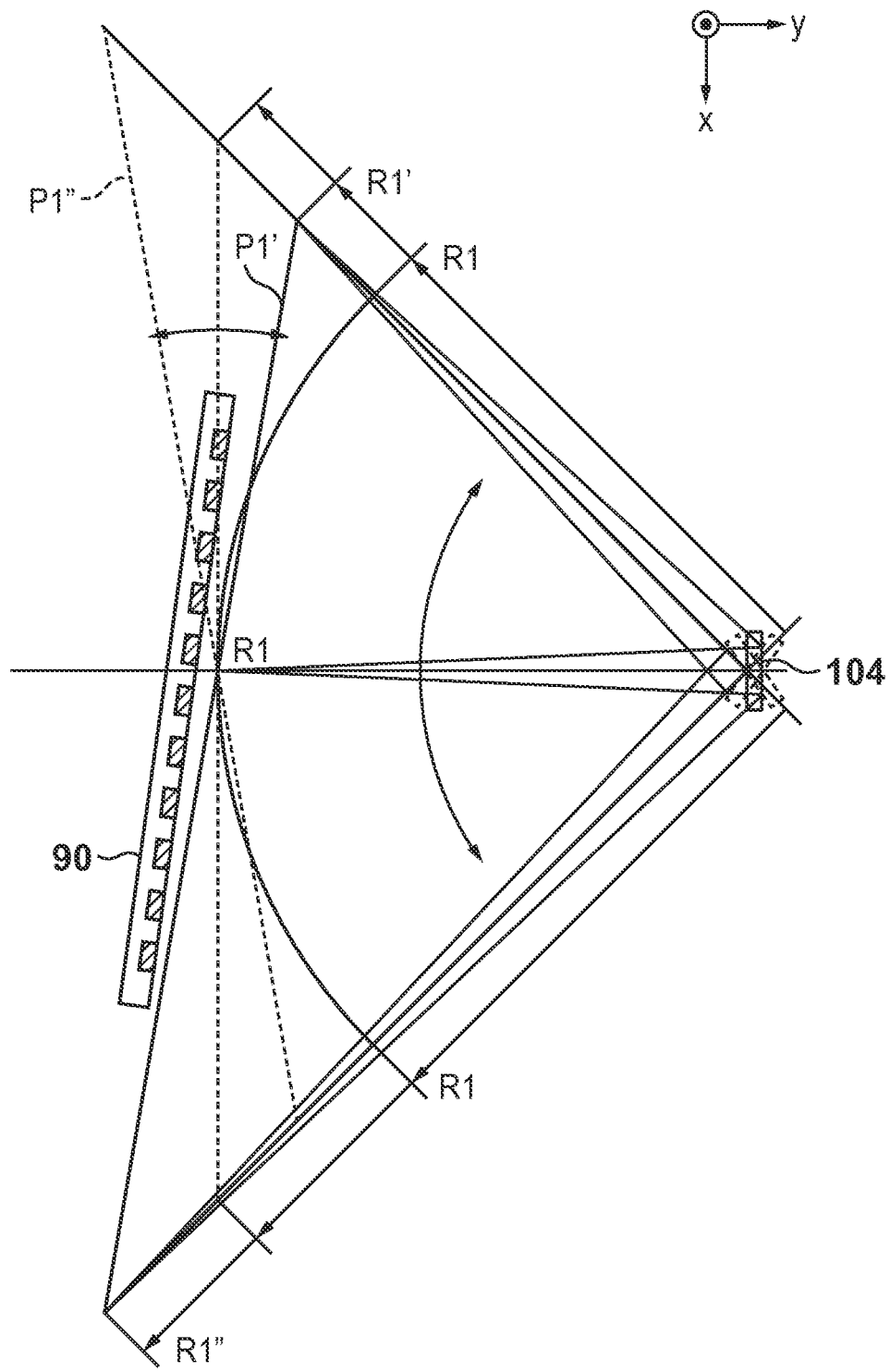
FIG. 4 is a plan view illustrating another function of the present invention.

In FIGS. 2A to 2C, the magnitudes of bending deformation in the states (R1') and (R1") of FIG. 2B are the same so that the distance from the scanning center to the beam waist is the same between the upper end and the lower end of the scan. However, the magnitudes of bending deformation in the states (R1') and (R1") may also be different from each other, by adjusting the frequency of the drive signal that is applied to the piezoelectric element 30 by the driving circuit 61. With this, it is possible to incline the scan surface on which the beam waist position is maintained as a surface P1' shown in FIG. 4. That is, this makes it possible to rotate the scan surface from the surface P1' to a surface P1". This means that, even when the barcode is rotated around the z-axis and inclined with respect to an ideal plane, it is possible to perform detection with a high resolution by rotation of the scan surface.

Accordingly, in the present embodiment, the curvature of the mirror surface of the variable focus mirror is changed by the second electric signal and the third electric signal so that the beam waist of a light flux reflected by the mirror section 104 is located on the scan surface of the object being scanned that is an object on a plane. With this, it is possible to improve the reading rate while reducing the number of optical components.

Figure 5A:
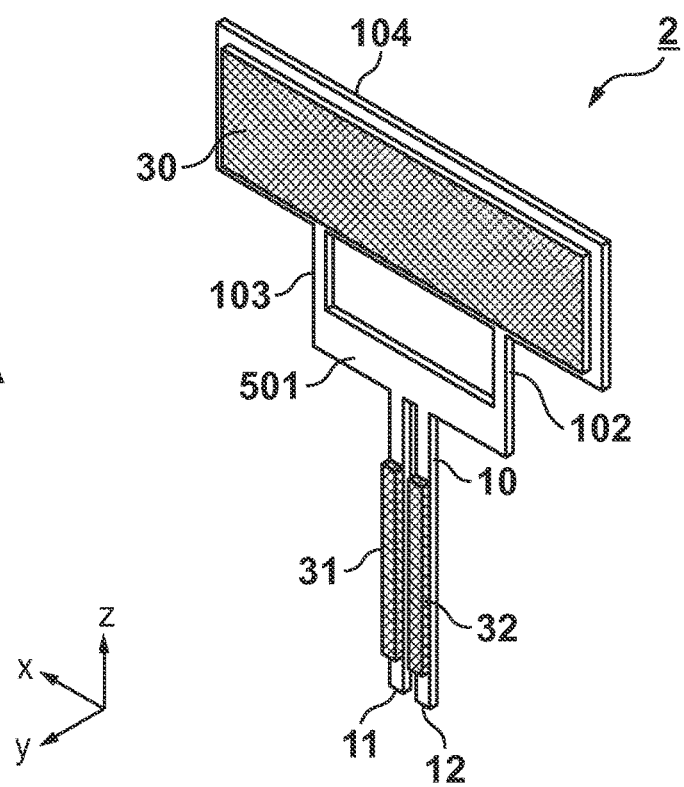
FIG. 5A is a perspective view illustrating another configuration of the first embodiment of the present invention.
Figure 5B:
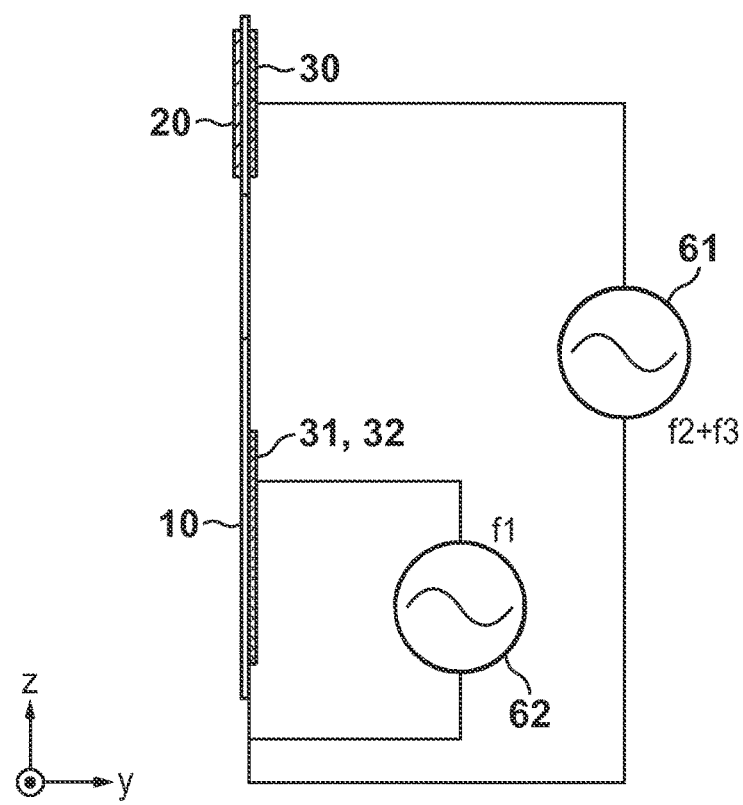
FIG. 5B is a diagram illustrating the other configuration of the first embodiment of the present invention.

FIGS. 5A and 5B show an example of another configuration of the first embodiment of the present invention. An optical scanning device 2 differs from the optical scanning device shown in FIG. 1A in the rotational mechanism of the mirror section 104. In FIG. 5A, a connecting member 501, which is hidden in FIG. 1A, for connecting two supporting sections 102 and 103 is shown. Furthermore, the torsion beam 101 is constituted by two beams 11 and 12, which extend from the connecting member 501 and are in parallel to each other. The beams 11 and 12 are respectively provided with piezoelectric elements 31 and 32. The piezoelectric elements 31 and 32 are respectively provided on two beams 11 and 12, and serve as first piezoelectric elements to which the first electric signal is applied. Furthermore, a driving circuit 62 shown in FIG. 5B applies an electric signal to the piezoelectric elements 31 and 32 so that the beams 11 and 12 are bent and deformed in opposite directions, thereby inducing rotational vibration to the mirror section 104. Since the piezoelectric elements 31 and 32 can be formed similarly to the piezoelectric element 30, it is possible to simplify the manufacturing process. Furthermore, since the magnets and the coil can be omitted, it is possible to achieve further downsizing by a reduction in number of components.

In addition to the configuration of FIGS. 5A and 5B, a configuration in which a coil pattern is formed on the mirror section 104, and a magnet is externally arranged may be used, the configuration inducing rotational vibration to the mirror section 104 by driving of a moving coil method. Furthermore, although in the configurations of FIGS. 1A to 1C and FIGS. 5A and 5B, the mirror section 104 is supported on one side, a two-sided-supported configuration may be used in which the torsion beams and the supporting sections are provided on both sides of the mirror section 104 (the upper part and the lower part). The two-sided-supported configuration is advantageous in that falling of the mirror surface can be prevented.

Figure 6A:
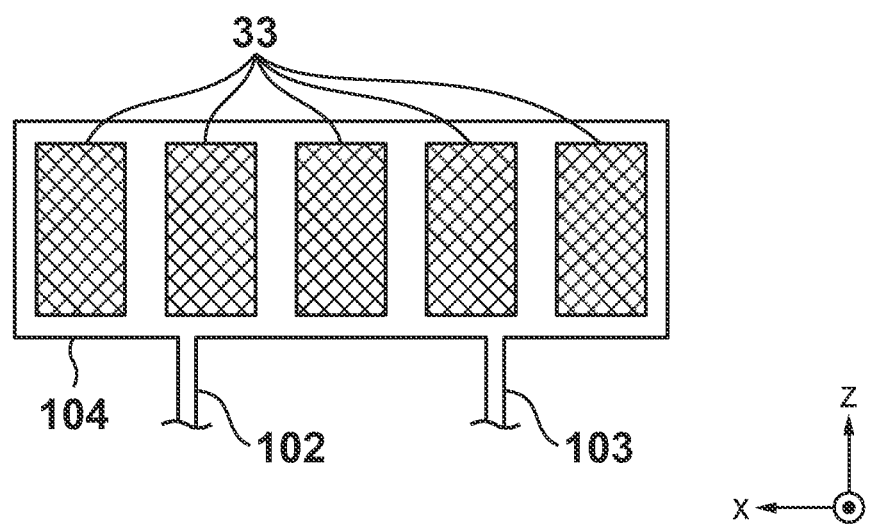
FIG. 6A is a diagram illustrating another configuration of the first embodiment of the present invention.
Figure 6B:
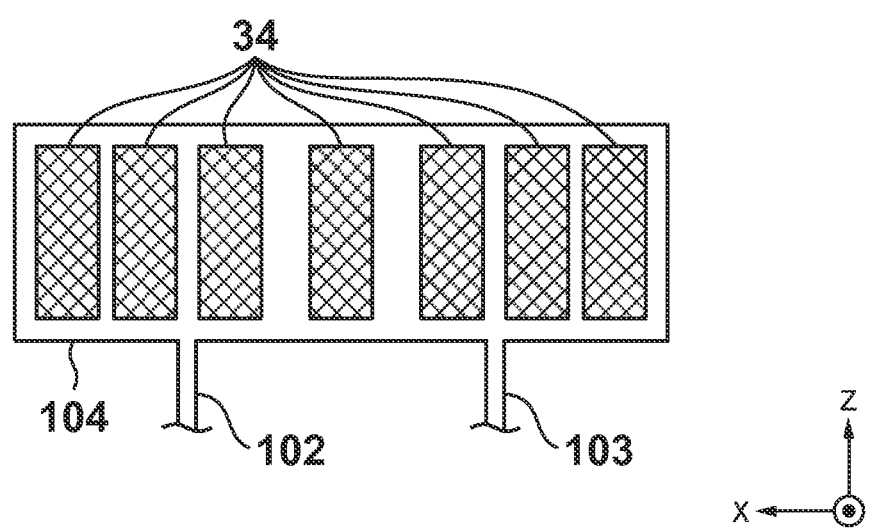
FIG. 6B is a diagram illustrating yet another configuration of the first embodiment of the present invention.

FIGS. 6A and 6B show examples of other configurations of the piezoelectric element 30. FIG. 6A shows the configuration in which a plurality of piezoelectric elements 33 that have the same shape are arranged on the rear surface of the mirror section 104 at substantially the same distance apart. By the driving circuit 60 applying different driving voltages to the respective piezoelectric elements 33, it is possible to form a curvature distribution of the mirror surface and to perform spherical aberration correction. That is, the variation width of the curvature of the mirror surface is limited when only one piezoelectric element is used, but a curvature distribution can freely be formed when a plurality of piezoelectric elements are used, making aberration correction easy. Note that the drive signals that are applied to the plurality of piezoelectric elements 33 have different amplitudes, but may have the same phase and frequency.

FIG. 6B shows the configuration in which a plurality of uniform piezoelectric elements 34 are arranged at a different distance apart at the ends from those in the middle of the back surface of the mirror surface. The driving circuit 60 applies the same voltage to the plurality of piezoelectric elements 34, but the amount of bending deformation of the mirror section 104 is different depending on the position thereof. This is because the distances between the plurality of piezoelectric elements 34 are different between the ends and the middle of the mirror section 104. That is, drive signals that have, in all respects, the same amplitude as well as the same phase and frequency are supplied to the plurality of piezoelectric elements 34. When the plurality of piezoelectric elements 34 are densely arranged at the ends of the mirror section 104 and aren't densely arranged in the middle, a variable range of the curvature will be broad. Therefore, similarly to FIG. 6A, it is possible to form a curvature distribution on the mirror surface and use it for spherical aberration correction. Accordingly, the piezoelectric elements 33 and 34 function as second piezoelectric elements for varying the curvature of the mirror surface.

(Second Embodiment)

Figure 7:
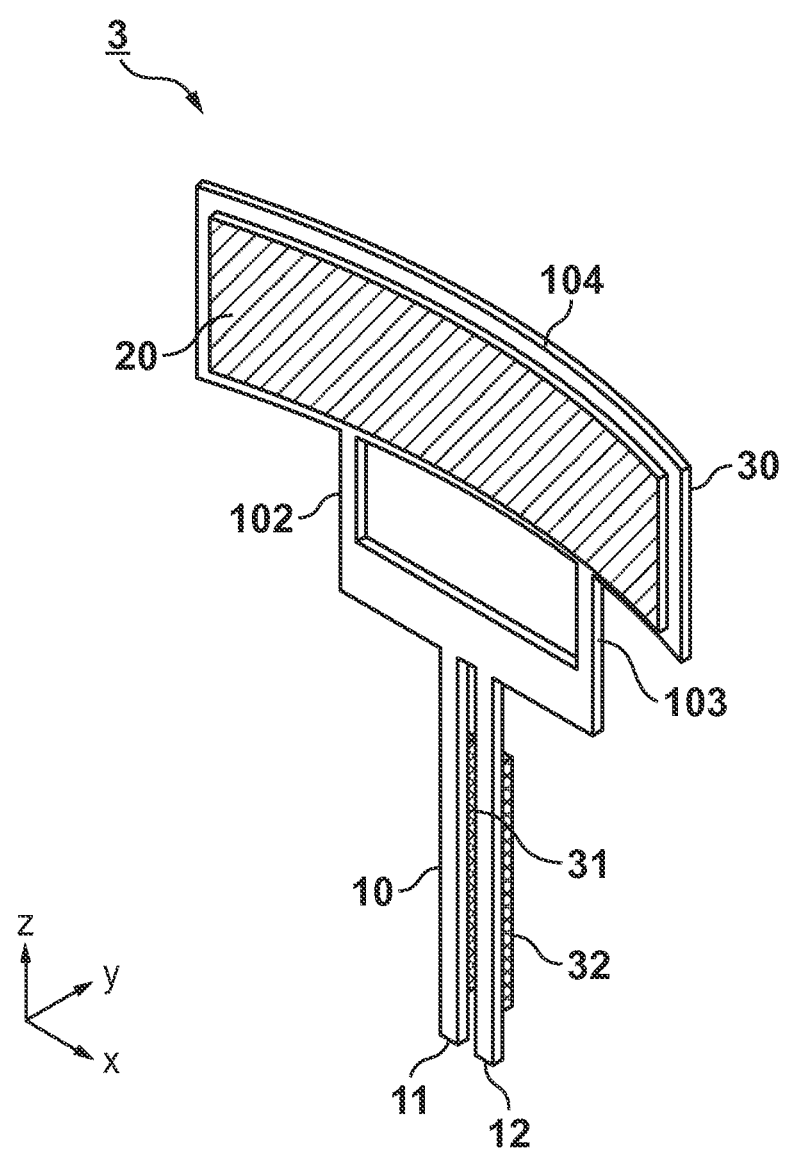
FIG. 7 is a perspective view illustrating a second embodiment of the present invention.

Hereinafter, a second embodiment of the present invention will be described with reference to FIG. 7. The configuration of FIG. 7 is similar to the configuration shown in FIG. 5A, but differs therefrom in that the mirror section 104 is already curved without any voltage being applied to the piezoelectric element 30. As a processing for forming a curvature of the mirror section 104, mechanical bending processing, thermal bending processing using a laser, or the like may be adopted. A metal material is used for the vibrating member 10. A metal glass may be used for the metal material. By performing bending processing on the metal glass in a supercooled region, it is possible to make formation of a curvature and formation of a mirror surface by transfer of the mold at the same time. Therefore, the reflective film 20 is not necessary. Giving a curvature to the mirror section 104 may be performed using a roller at the same time as metal rolling if the mirror section 104 is made from a metal material. Furthermore, it is also possible to give a curvature to the mirror section 104 by controlling film stresses caused by the reflective film 20 and a film (not shown) that is arranged on the rear surface of the mirror section 104. After a curvature is given to the mirror section 104, the piezoelectric element 30 may also be formed by direct film deposition.

FIG. 8 is a diagram illustrating a stress change when the mirror section 104 is repeatedly bent and deformed. When the mirror section 104 is not deformed in advance (that is, when the mirror surface is flat while a voltage is not applied to the piezoelectric element 30), an offset voltage for obtaining a minimum required curvature is applied to the piezoelectric element 30, and then an electric signal obtained by superimposing the second frequency f2 and the third frequency f3 shown in FIG. 3 is applied. At that time, a change in stress that is applied to the joint surfaces of the piezoelectric element 30 and the mirror section 104 is offset as indicated by δ1 of FIG. 8, and thus the maximum stress that is to be applied to the mirror section 104 is very large. This may cause a problem that the piezoelectric element 30 is detached due to repeated deformation, for example.

On the other hand, in the mirror section 104 to which a curvature has been given in advance, the maximum stress can relatively be reduced since a change in stress that is applied to the joint surfaces of the piezoelectric element 30 and the mirror section 104 varies equally between the positive and the negative as indicated by δ2 of FIG. 8. Accordingly, the problem that the piezoelectric element 30 is detached, for example, is not likely to occur even in the case of repeated deformation, and thus it is possible to realize a highly reliable optical scanning device 3. Accordingly, by forming at least part of the torsion beams 11 and 12 and the mirror section 104, serving as a variable focus mirror, from a metal material, and configuring the mirror surface of the mirror section 104 that is bent and deformed in a state in which none of the first electric signal, the second electric signal, and the third electric signal is generated, it is possible to improve the durability of the optical scanning device.

EXAMPLES

The following will describe examples of an image reading system using the optical scanning device according to the present invention.

Example 1

FIG. 9 shows an image reading system 5 according to an example. The optical scanning device 3 shown in FIG. 7 is used as an optical scanning device, but either one of the optical scanning devices 1 and 2 may be used. As a material of the vibrating member 10, SPRON 510 (manufactured by Seiko Instruments Inc.) of Co—Ni—Cr—Mo alloy is used, and the vibrating member 10 is formed by wire cut processing. As the piezoelectric element 30 that is arranged on the rear surface of the mirror section 104, a PZT film that is formed by an aerosol deposition method is used.

In the image reading system 5, laser light output from a laser light source 70 is reflected by the optical scanning device 3, and scans the barcode 90, serving as an object to be scanned, that is arranged on the scan surface. During scanning, by varying a scan distance from the scanning center of the mirror section 104 to the barcode depending on the scan position on the barcode, the beam waist of the laser light is always maintained on the barcode. A driving circuit 63 outputs the above-described first to third drive signals. Scattered light from the barcode 90, which is reflected light from the object being scanned, is collected on a photosensor 80 via a collecting lens 35, which is a light collecting member for collecting scattered light, and is detected by the photosensor 80. The photosensor 80 functions as a light receiving element for receiving the reflected light collected by the light collecting member. A signal processing circuit 64 converts an analog signal that is output from the photosensor 80 into a digital signal, generates an image signal that corresponds to the barcode 90, and outputs the generated signal to a decoder 65. The decoder 65 decodes the barcode 90 based on the image signal. Since the image reading system 5 of the present example uses the optical scanning device 3 of the present invention, the image reading system 5 can detect even a high-resolution wide pattern, with a high resolution, and can be downsized.

Example 2

Figure 10A:
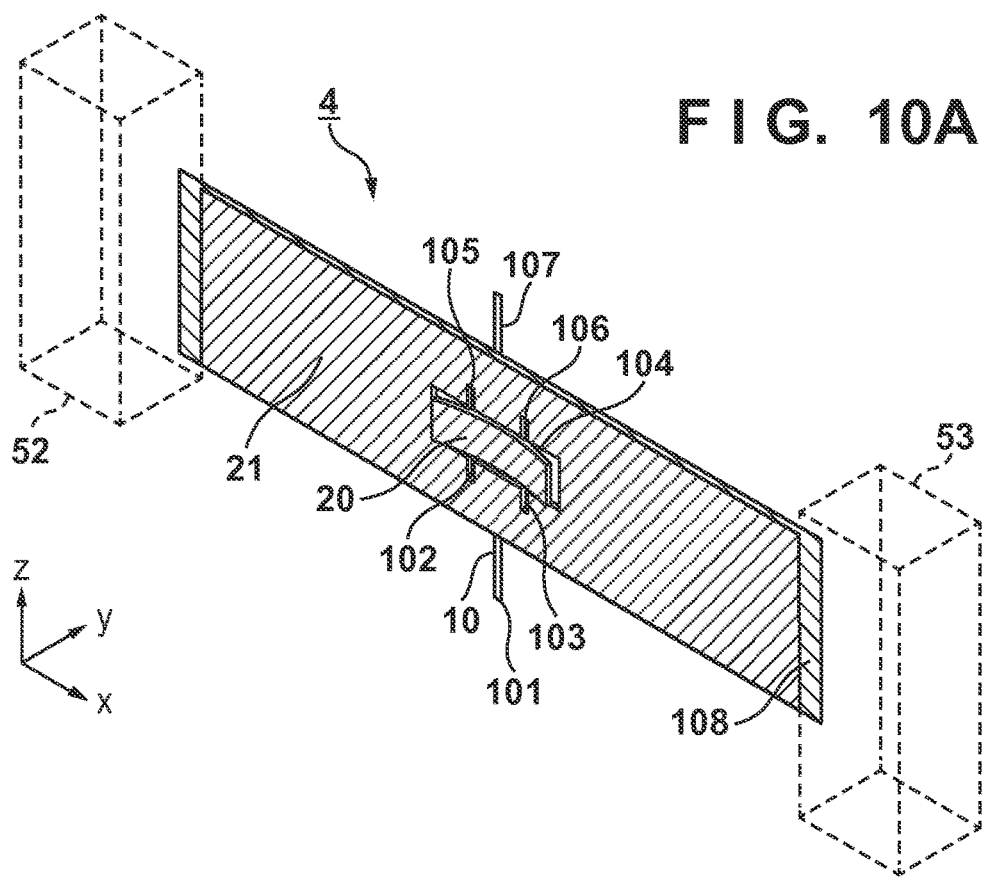
FIG. 10A is a perspective view illustrating Example 2 of the present invention.
Figure 10B:
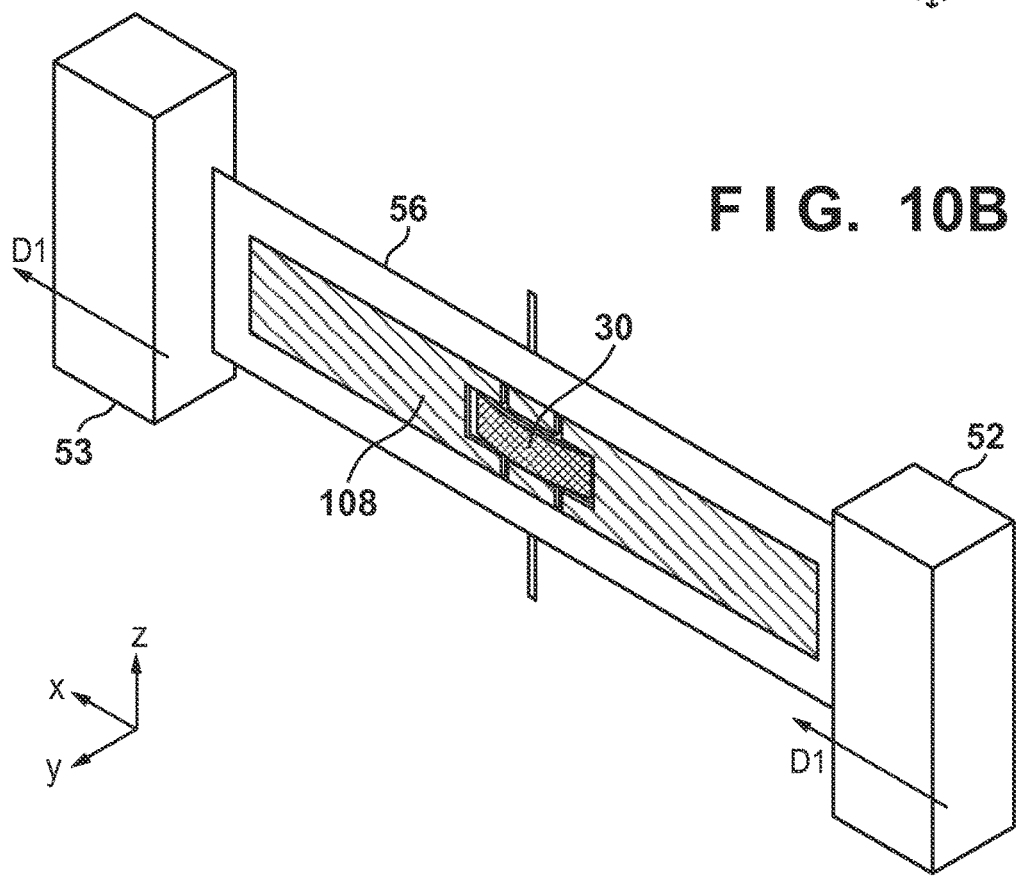
FIG. 10B is a perspective view illustrating Example 2 of the present invention.

FIGS. 10A and 10B show an example of an optical scanning device of the present invention. An optical scanning device 4 adopts a two-sided-supported configuration in which torsion beams 101 and 107 are provided on two sides, the configuration being developed from the configuration of FIGS. 1A to 1C. An outer mirror 108 for efficiently detecting return light from an optical pattern is provided. Furthermore, instead of the magnets being arranged on the vibrating member 10, a coil pattern 56 is formed on the rear surface of the outer mirror 108, and magnets 52 and 53 are provided outside the outer mirror 108. That is, the optical scanning device 4 adopts a configuration for inducing torsional vibration by a moving coil method. Note that the coil pattern 56 functions as a coil that is arranged corresponding to the magnets 52 and 53, and generates a magnetic field upon application of an electric signal of a first frequency. The magnetizing directions of the magnets 52 and 53 are parallel to the magnetic field generated by the coil pattern 56. That is, the magnetizing directions of the magnets 52 and 53 only need to be the direction of the arrow D1 or the opposite direction. With this, a rotational torque is generated.

A reflective film 21 is formed on the surface of the outer mirror 108 so as to increase the reflection ratio. A space is formed in the middle of the outer mirror 108, and the mirror section 104 is arranged in this space. The mirror section 104 is connected to the outer mirror 108 by four supporting sections 102, 103, 105, and 106. Specifically, the supporting sections 105 and 106 are connected to the upper part of the mirror section 104, and the supporting sections 102 and 103 are connected to the lower part of the mirror section 104. The supporting sections 102, 103, 105, and 106 are arranged at positions of the mirror section 104 that are not displaced in the y-axis direction at the time of the bending vibration.

Figure 11:
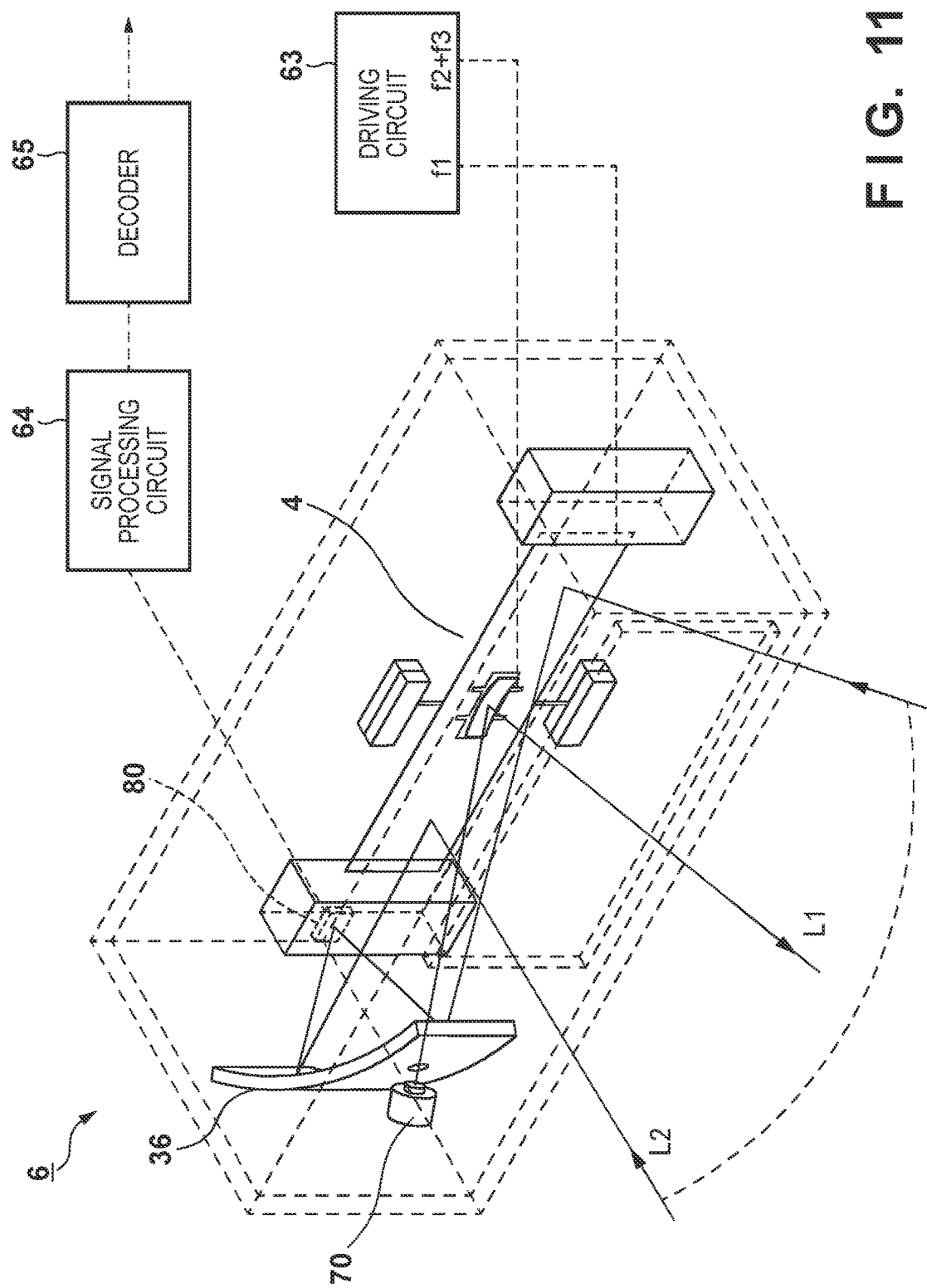
FIG. 11 is a perspective view illustrating Example 2 of the present invention.

FIG. 11 shows an image reading system 6, which is an example using the optical scanning device 4 of FIG. 10A. Laser light L1 that was emitted from the laser light source 70 is reflected on the mirror section 104, and scans the barcode 90. Scattered light L2 from the barcode 90 is reflected on the outer mirror 108, and travels to a light collecting mirror 36, which is a light collecting member. The scattered light L2 is collected by the light collecting mirror 36, and enters the photosensor 80. In this way, the outer mirror 108 selectively reflects, on the light collecting mirror 36, only the scattered light L2 in the direction in which the laser light L1 has been projected, making it possible to further improve the detection accuracy. According to the present example, the size of the image reading system 6 is larger than the size of the image reading system 5 shown in FIG. 9, but the image reading system 6 can realize an image reading system that has a high reading rate even with respect to a high-resolution wide pattern, due to an interactive effect of a high resolution by displacing the beam waist position of the laser light L1, and an improvement in detection accuracy using direction selective detection.

(Third Embodiment)

The following will describe another example of the operation of the optical scanning device according to the present invention with reference to FIGS. 12A to 16B.

Figure 12A:
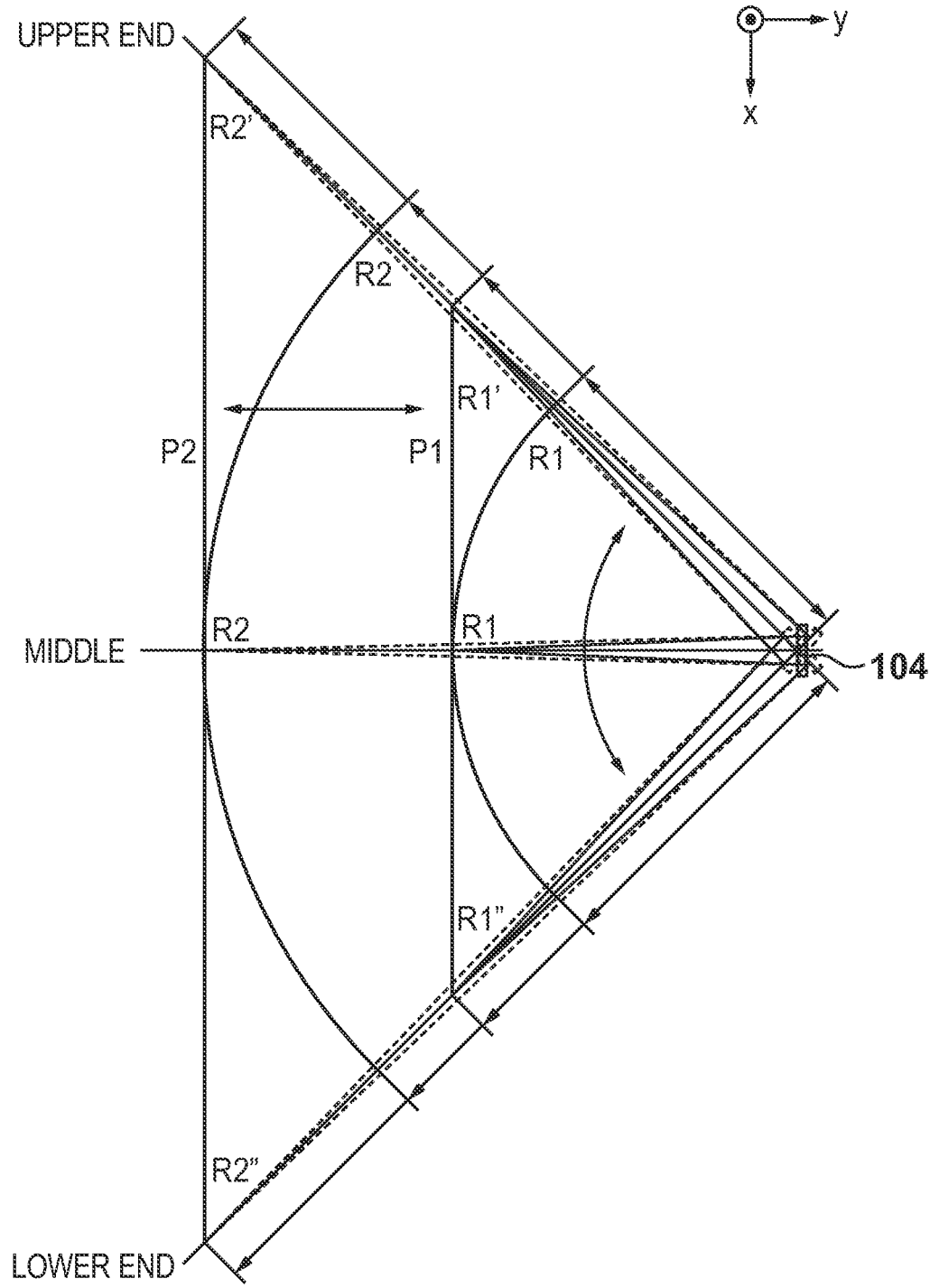
FIG. 12A is a plan view illustrating the function of the present invention.
Figure 12B:
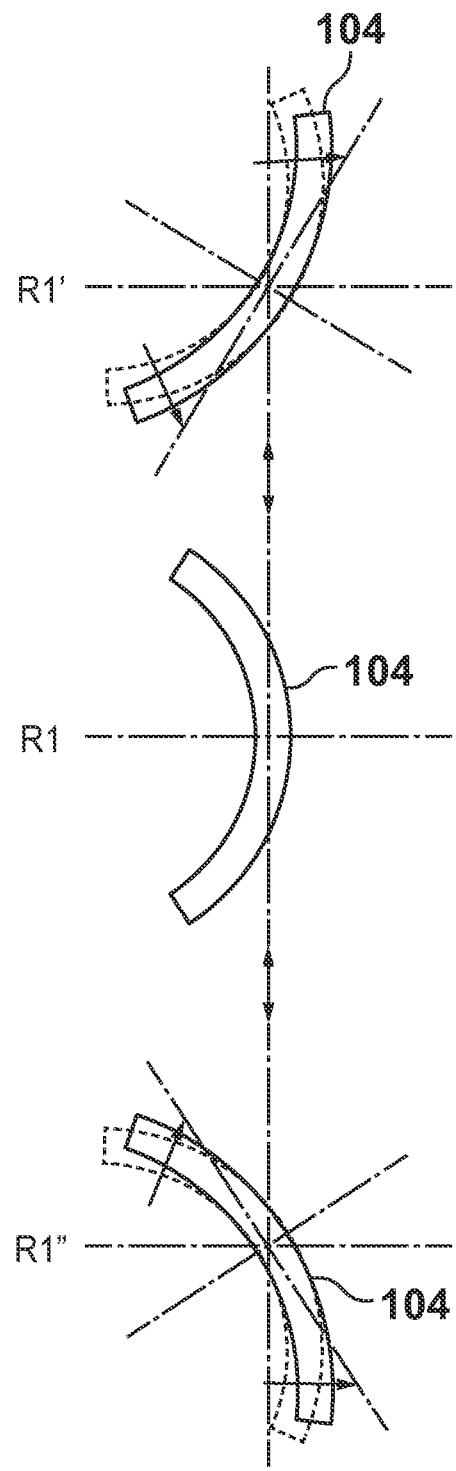
FIG. 12B is a plan view illustrating the function of the present invention.

FIG. 12A shows a state of laser light scanning by the optical scanning device according to the present invention. Furthermore, FIG. 12B shows aspects of deformation of the mirror member 104 that is arranged on the vibrating member 10, which serves as a rotating and vibrating body. This deformation is the same in an optical scanning direction and a sub-scanning direction that is perpendicular thereto.

It is assumed that, when the mirror member 104 is in the state in which it has a curvature as shown by R1 of FIG. 12B due to an electric signal that is applied to a piezoelectric material such as the piezoelectric element 30, the beam waist is located in the middle of the projection surface P1 that is at the distance R1 from the scanning center. When the state is shifted to the state R1' shown in FIG. 12B by rotation of the rotating and vibrating body caused by torsional vibration of the torsion beam 101, the curvature of the mirror member 104 decreases from that of the state R1 due to the change in the electric signal that is applied to the piezoelectric material. The beam waist is located at the right end of the projection surface P1 that is at the distance R1' from the scanning center.

If the curvature did not vary from the state R1, the beam waist would be located at the distance R1 in the direction to the end of scan, and the beam diameter would be extended on the right end of the projection surface P1. Similarly, in the case of scanning of the left end as well, the beam waist is maintained on the projection surface P1 by changing the curvature in the state R" of FIG. 12B.

In this way, control for changing mirror curvature two times during one reciprocation scan may be performed, that is, the mirror curvature is controlled using a signal having a frequency that is two times higher than a scan frequency. This enables optical scanning in which the beam waist position is maintained on substantially the same plane, without using a lens optical system such as an arcsine lens, the beam waist position being a position at which the minimum spot is formed.

Figure 12C:
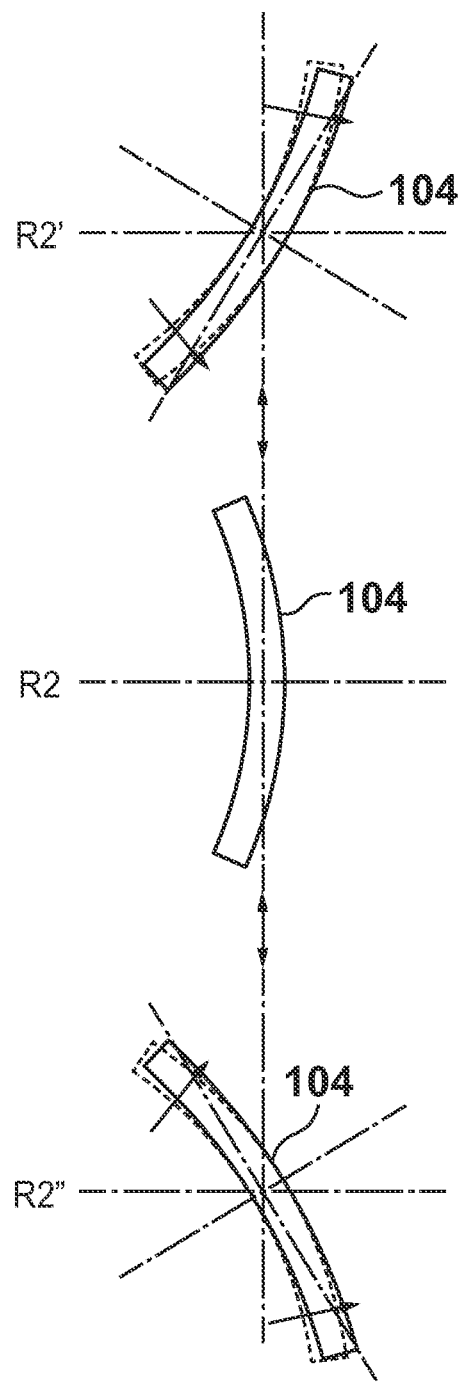
FIG. 12C is a plan view illustrating the function of the present invention.

FIG. 12C shows the modified state of the mirror member 104 for maintaining the beam waist on the projection surface P2 that has a longer projection distance than that of the surface P1. In FIG. 12C, by maintaining the state in which the curvature is larger than that of FIG. 12B, the beam waist position is shifted from R2, to R2', to R2, to R2", and to R2, in the stated order. Accordingly, it is also possible to change the surface on which the beam waist is maintained by controlling a drive signal of the piezoelectric material.

Figure 13:
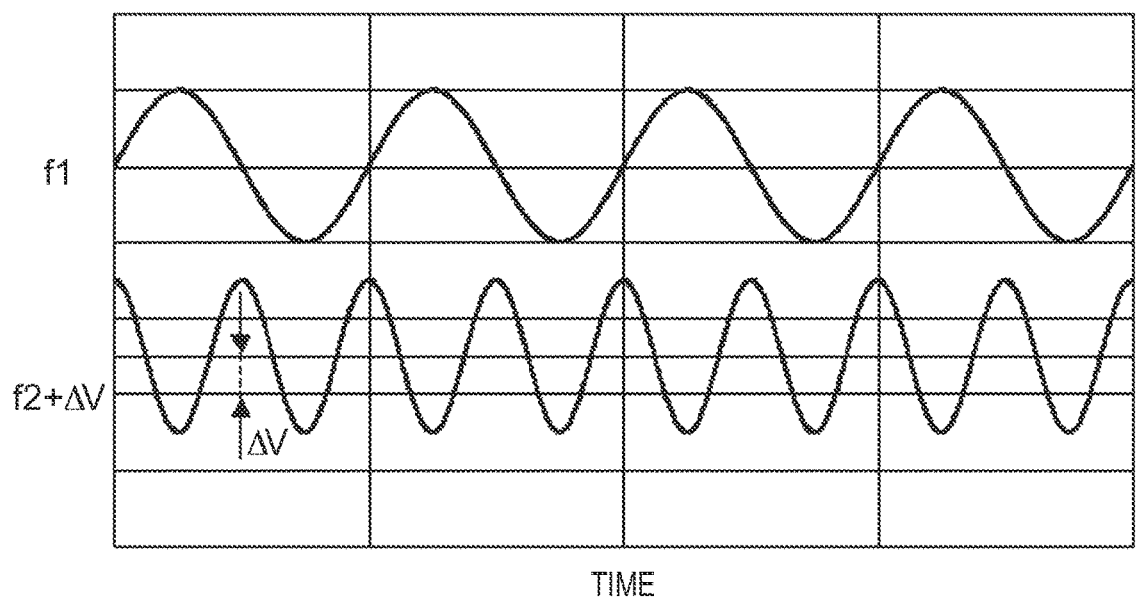
FIG. 13 is a graph illustrating drive signals of the present invention.

FIG. 13 shows examples of drive signals for performing scanning as shown in FIGS. 12A to 12C. The driving circuit 60 for inducing rotational vibration to the rotating and vibrating body applies a drive signal of the frequency f1, whereas the driving circuit 61 for inducing curvature deformation to the mirror member 104 applies a signal obtained by adding an offset voltage ΔV to a drive signal of the frequency f2 that is two times higher than the frequency f1. The drive signal of the frequency f2 is a signal component for maintaining the beam waist on the scan surface during one scanning. ΔV is a signal component for changing the surface on which the beam waist is maintained. When the mirror is rotated and vibrated using a resonance, the phases of the drive signal f1 and the rotation angle of the mirror are shifted by 90 degrees, and thus the phase of the drive signal of the frequency f2 is shifted from the phase of the drive signal of the frequency f1 so that the curvature deformation of the mirror is controlled depending on the rotation angle.

The following will describe the moving speed of a beam spot formed on the projection surface. In the optical scanning device 1, the beam intensity is varied based on time-series data while the beam is scanned, or a change in intensity of reflected light during beam scanning is detected as time-series data. With this, image formation and projection, reading of an optical pattern, and the like are performed. At that time, when the moving speed of the beam is largely changed, a distortion of the image or a change in reading resolution may be caused. A method for correcting the time-series data so that a change in beam intensity corresponds to a change in moving speed of the beam, and a method for letting the reading speed correspond to the change in moving speed are also considered. However, these methods need expensive controlling means that operates with a high speed. The beam spot is required to move on the projection surface with a speed that is as constant as possible. The scan angle of the beam of the vibrating mirror varies in the shape of a sine curve, but, among them, a scan angle that is in a range in which a constant speed is obtained on the projection surface may be used.

Figure 14:
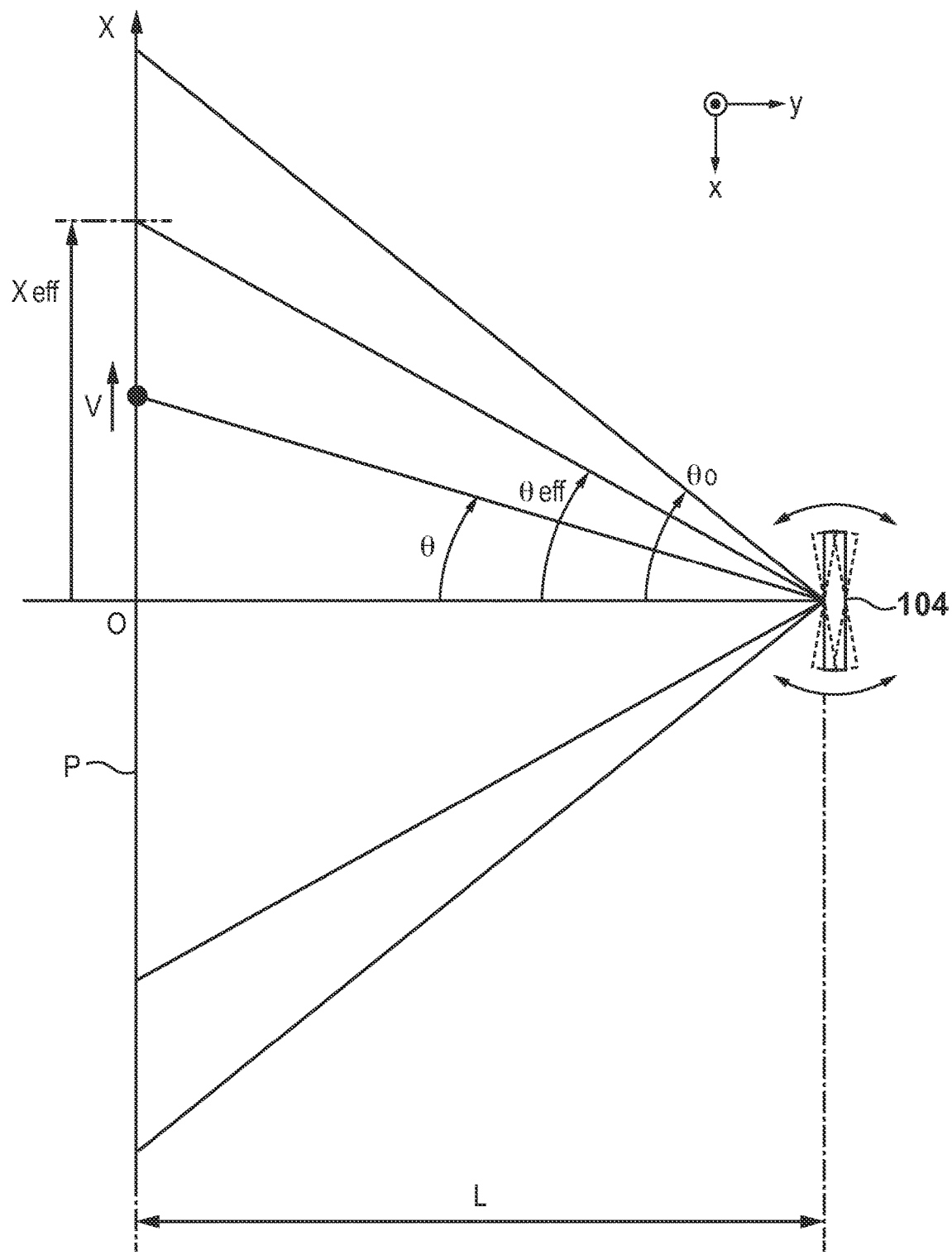
FIG. 14 is a plan view illustrating an operation of an optical scanning device of the present invention.

Similar to FIG. 12A, FIG. 14 shows the state of optical scanning. Taking the scanning center as a standard, the maximum scan angle of the beam due to rotational vibration of the mirror member 104 is defined as θo. An effective range in which scan light is actually used, of the maximum scan angle, is defined as θeff. The range that corresponds to θeff on a projection surface P located at the distance L from the scanning center is defined as Xeff.

Assuming that the projection surface P of FIG. 12A is P1, the position of Xeff corresponds to the position of R1' that is at the end of the projection surface P1. It is assumed that the beam direction is the direction of angle θ. At that time, the moving speed of the beam spot formed on the projection surface P is V, and the moving speed when the angle θ=0 is Vo. Taking Vo as a standard, the change rate V/Vo of the moving speed V with respect to the angle θ is as shown in FIG. 15A. The horizontal axis shows an angle θ that indicates the beam direction, and the vertical axis shows the change rate V/Vo of the moving speed V. When the maximum scan angle θo is increased, the moving speed V with respect to the angle θ varies as shown by i to v of the figure.

Here, assuming that an allowable error in the spot moving speed is Δv, the angle in this range of the graph iii, that is, the effective scan angle θeff is θ3. In the graph iv in which the maximum scan angle θo is increased, the effective scan angle extends to θ4. However, in the graph v in which the maximum scan angle is further increased, the effective scan angle is θ5 and thus smaller than θ4. Therefore, even by increasing the maximum scan angle θo as compared with θ4, it is not possible to extend the effective scan angle θeff.

Figure 15B:
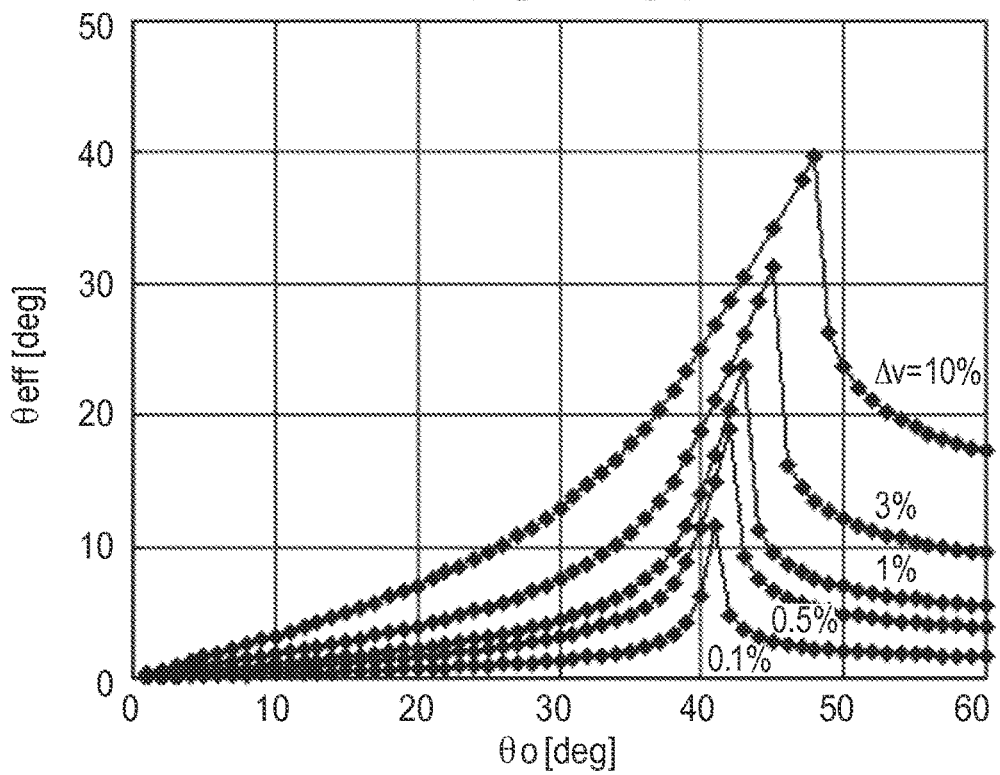
FIG. 15B is a graph illustrating an operation of the optical scanning device of the present invention.

FIG. 15B shows the relationship between the maximum scan angle θo and the effective scan angle θeff. According to FIG. 15B, the maximum scan angle in which the effective scan angle θeff is the largest differs depending on the magnitude of the allowable error Δv.

Figure 15C:
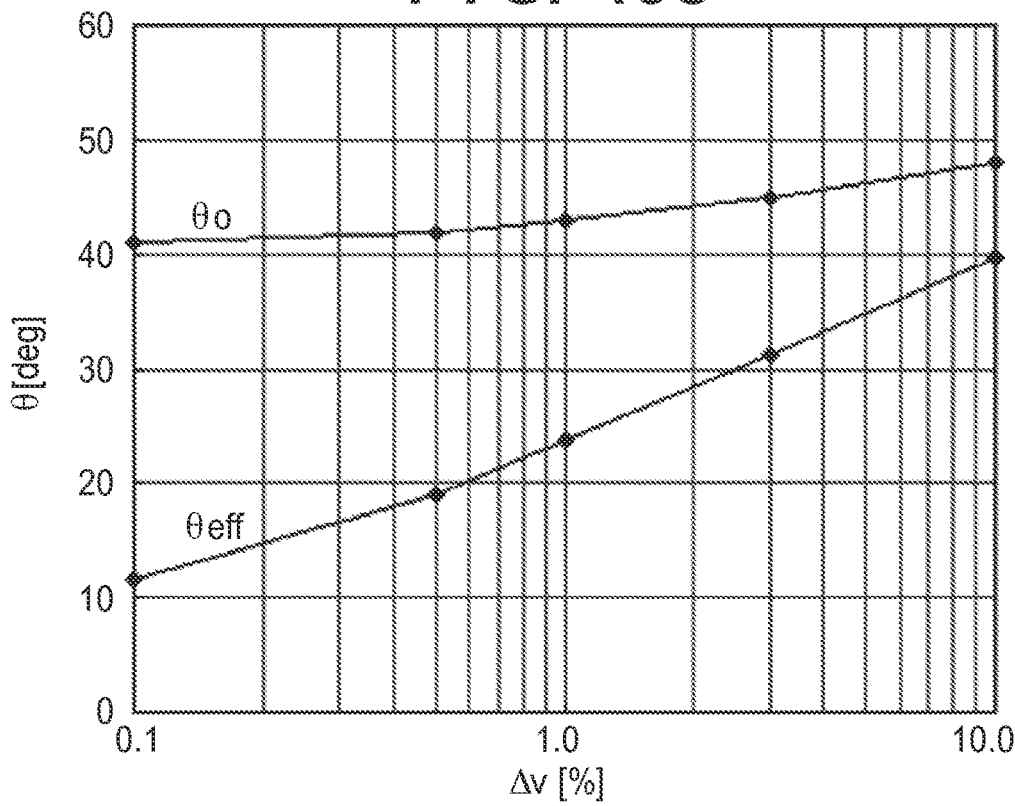
FIG. 15C is a graph illustrating an operation of the optical scanning device of the present invention.

FIG. 15C shows the maximum effective scan angle θeff with respect to the magnitude of the allowable error Δv, and the maximum scan angle θo that is needed for obtaining the maximum effective scan angle θeff. In order to obtain the maximum effective scan angle θeff, the maximum scan angle θo of at least 40 degree is needed, although there is a difference due to the allowable error Δv. In the optical scanning device 1, there may be the case where it is necessary to perform image formation or reading with a short projection distance and in a wide range. Accordingly, the effective scan angle θeff is set as wide as possible. Furthermore, the maximum scan angle θeff may also be set as narrow as possible in view of downsizing of the vibrating mirror or power consumption. Therefore, the vibrating mirror is operated at the maximum scan angle θo at which the effective scan angle θeff achieves a peak. Accordingly, it is also possible to set a maximum scan angle with respect to the scanning center to ±40 degrees or more, and a rotational vibration amplitude of the vibrating mirror to ±20 degrees or more. In order to realize this amplitude with the small vibrating mirror, the torsion beam 101 that supports the mirror needs to have a high strength and durability. For example, an age-hardening Co—Ni base alloy may be used as a material of the torsion beam 101.

The following will describe a change in diameter of the beam spot that is projected on the projection surface during optical scanning. In the optical scanning device 1, the diameter of the beam spot largely affects the resolution of an image that is formed or projected by optical scanning, or the reading resolution of an optical pattern. Therefore, a change in diameter of the beam spot within the effective scan region may be reduced as much as possible.

Figure 16A:
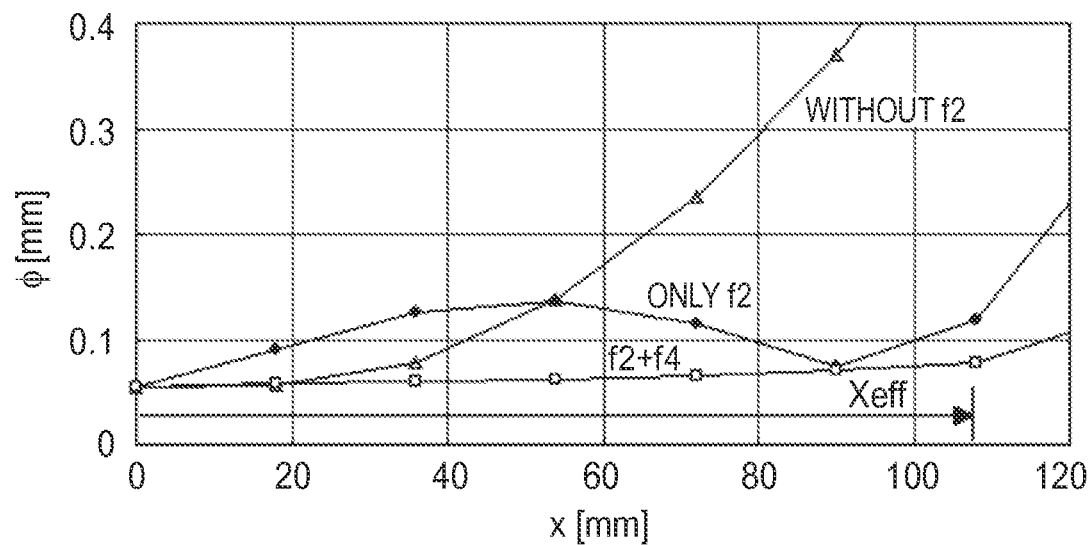
FIG. 16A is a graph illustrating an operation of the optical scanning device of the present invention.

FIG. 16A shows an example of a change in diameter of the beam spot at a position on the projection surface. FIG. 16A shows a change in diameter of the beam spot when, in FIG. 14, the projection distance L is set to 174 mm, and the beam spot is moved from the middle O of the projection surface in the x-axis direction by rotational vibration of the vibrating mirror. In FIG. 16A, the horizontal axis shows a distance from the middle of the projection surface, and the vertical axis shows the diameter of the beam spot.

Figure 16B:
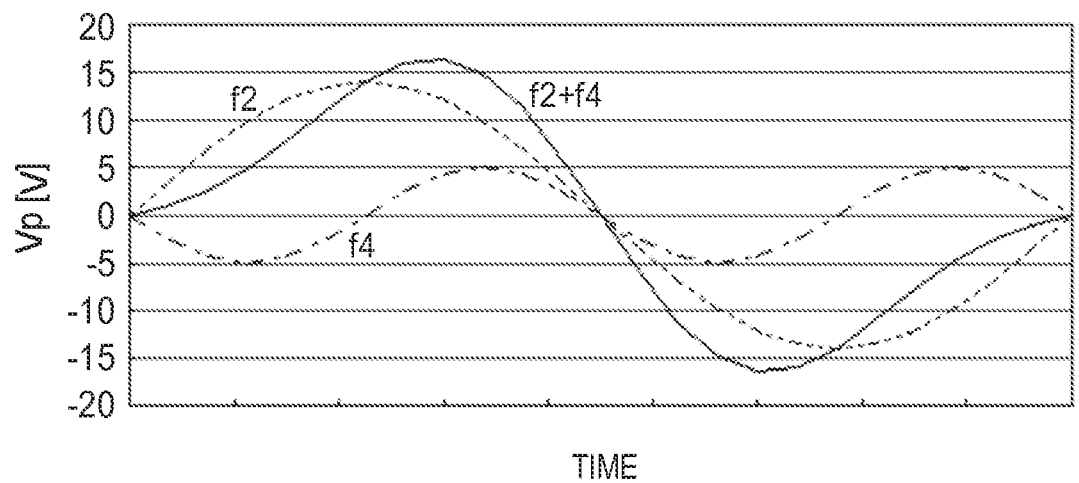
FIG. 16B is a graph illustrating an operation of the optical scanning device of the present invention.

FIG. 16B shows examples of drive signals that are applied to the piezoelectric material in order to change the curvature of the mirror member 104. The drive signal of the frequency f2 is a signal having the frequency of rotational vibration of the vibrating mirror, that is, a frequency that is two times higher than the scan frequency f1. This is the same signal as the drive signal of the frequency f2 shown in FIG. 13. The drive signal of the frequency f4 is a signal having a frequency that is four times higher than the frequency f1. The drive signal of the frequency f2+f4 is a signal generated by superimposing the drive signal of the frequency f2 and the drive signal of the frequency f4 in an appropriate proportion. The change in diameter of the beam spot, which depends on the position on the scan surface, when mirror deformation that is synchronized with the scan frequency is not performed is shown by the graph "without f2" of FIG. 16A. It is clear from FIG. 16A that the diameter of the spot drastically increases while approaching the end of scan.

On the other hand, the diameter of the beam spot when the curvature of the mirror member 104 is varied by the drive signal of the frequency f2 is shown by the graph "only f2"

of FIG. 16A. With this, it is possible to significantly suppress a change in diameter of the beam spot within the effective scan range Xeff. Furthermore, the diameter of the beam spot when the curvature of the mirror member 104 is varied by the drive signal obtained by superimposing the drive signals of frequencies f2 and f4 is shown by the graph "f2+f4" of FIG. 16A. It is possible to obtain a substantially constant diameter of the beam spot irrespective of the position.

The above-described effects of constant speed characteristics or the stabilized diameter of the beam spot can be obtained when the vibrating mirror can perform stable optical scanning without causing abnormal vibration or the like. The vibrating mirror of the present invention may be used to appropriately set the maximum scan angle, and to control the curvature of the mirror with drive signals having frequencies that are two and four times higher than the scan frequency. Accordingly, it is possible to realize an optical scanning device that can perform image formation and projection, reading of an optical pattern, and the like with high accuracy.

The optical scanning device 1 according to the present embodiment is applicable to the above-described image reading device of Example 1 and the image reading system of Example 2, achieving the same effects as those of the above-described other embodiments. Furthermore, the present invention is also applicable to an image forming device or an image projecting device.

The present invention is not limited to the above-described embodiments, and various changes and modifications can be made within the spirit and scope of the present invention. Therefore, to apprise the public of the scope of the present invention, the following claims are made.

The invention claimed is:

1. An optical scanning device comprising:
   a torsion beam;
   a variable focus mirror that is supported by the torsion beam;
   a first electric signal generation unit that is configured to generate a first electric signal having a first frequency so as to induce torsional vibration to the torsion beam; and
   a second electric signal generation unit that is configured to generate a second electric signal having a frequency that is two times higher than the first frequency and a third electric signal having a third frequency that is lower than the first frequency, so as to induce a bending vibration to the variable focus mirror, the bending vibration being obtained by superimposing deformation by the second electric signal and deformation by the electric signal having the third frequency,
   wherein while the variable focus mirror changes a direction of a light flux by torsional vibration to the torsion beam and a focus of the variable focus mirror is adjusted for an object to be scanned by changing a curvature of a mirror surface of the variable focus mirror, the object to be scanned is scanned with the light flux reflected by the mirror surface of the variable focus mirror.

2. The optical scanning device according to claim 1, wherein the variable focus mirror has a mirror section that is provided in one piece with the torsion beam, and a reflective film that is provided on at least one surface of the mirror section.

3. The optical scanning device according to claim 1, wherein at least a part of the torsion beam and variable focus mirror is made from a metal material, and the mirror surface of the variable focus mirror is bent and deformed in a state in which none of the first electric signal, the second electric signal, and the third electric signal is generated.

4. The optical scanning device according to claim 1, wherein the object to be scanned is an object on a flat surface, and the curvature of the mirror surface of the variable focus mirror is changed with the second electric signal and the third electric signal so that a beam waist of the light flux reflected by the variable focus mirror is located on the object to be scanned.

5. The optical scanning device according claim 1, further comprising:
   two supporting sections that support the variable focus mirror, the supporting sections being arranged at two symmetrical positions with respect to the axis of rotation of the torsion beam.

6. The optical scanning device according to claim 1, further comprising:
   a magnet; and
   a coil that is arranged corresponding to the magnet, and generates a magnetic field upon application of the electric signal having the first frequency.

7. The optical scanning device according to claim 1, further comprising:
   a connecting member that connects the two supporting sections;
   two beams that extend from the connecting member, and serve as the torsion beam; and
   first piezoelectric elements that are respectively provided on the two beams, and to which the first electric signal is applied.

8. The optical scanning device according to claim 7, further comprising:
   at least one piezoelectric element that is arranged on a surface opposite to the mirror surface of the variable focus mirror, and is configured to change a curvature of the mirror surface upon application of the second electric signal and the third electric signal.

9. The optical scanning device according to claim 8, wherein the at least one piezoelectric element includes a plurality of piezoelectric elements that are arranged at substantially the same distance.

10. The optical scanning device according to claim 8, wherein the at least one piezoelectric element includes a plurality of piezoelectric elements that are arranged at a different distance apart at the ends from those in the middle of the surface opposite to the mirror surface of the variable focus mirror.

11. An image reading system comprising:
    a light source that outputs a light flux;
    an optical scanning device;
    a light collecting member that collects reflected light from an object to be scanned; and
    a light receiving element that receives the reflected light collected by the light collecting member,
    wherein the optical scanning device comprises an optical scanning device as claimed in claim 1.

12. An optical scanning device comprising:
    a torsion beam;
    a variable focus mirror that is supported by the torsion beam; and
    a drive controller that simultaneously generates a first drive signal for inducing torsional vibration to the torsion beam, and a second drive signal for subjecting the variable focus mirror to bending deformation, wherein the drive controller generates, as the second drive signal, a signal obtained by superimposing a plurality of frequencies that are different from a first frequency of the first drive signal.

13. The optical scanning device according to claim 12, wherein the drive controller generates, as the second drive signal, a signal that includes a signal having a frequency that is an even multiple of the first frequency.

14. The optical scanning device according to claim 13, wherein the drive controller generates, as the second drive signal, a signal obtained by superimposing a signal having a frequency that is two times higher than the first frequency of the first drive signal, and a signal having a frequency that is four times higher than the first frequency.

15. The optical scanning device according to claim 12, wherein the drive controller generates the second drive signal while generating the first drive signal.

16. An image reading system comprising:
a light source that outputs a light flux;
an optical scanning device;
a light collecting member that collects reflected light from an object to be scanned; and
a light receiving element that receives the reflected light collected by the light collecting member,
wherein the optical scanning device comprises an optical scanning device as claimed in claim 12.

* * * * *